United States Patent
Masui

(10) Patent No.: US 10,795,229 B2
(45) Date of Patent: Oct. 6, 2020

(54) ELECTRO-OPTICAL DEVICE AND ELECTRONIC APPARATUS

(71) Applicant: SEIKO EPSON CORPORATION, Tokyo (JP)

(72) Inventor: Junichi Masui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 16/173,118

(22) Filed: Oct. 29, 2018

(65) Prior Publication Data

US 2019/0129263 A1 May 2, 2019

(30) Foreign Application Priority Data

Oct. 30, 2017 (JP) ................................ 2017-208892

(51) Int. Cl.
| | |
|---|---|
| *G02F 1/1362* | (2006.01) |
| *G02F 1/1347* | (2006.01) |
| *G02F 1/1335* | (2006.01) |

(52) U.S. Cl.
CPC ...... *G02F 1/136209* (2013.01); *G02F 1/1347* (2013.01); *G02F 1/133512* (2013.01); *G02F 1/133528* (2013.01); *G02F 2001/133548* (2013.01)

(58) Field of Classification Search
CPC ......... G02F 1/136209; G02F 1/133512; G02F 1/133528; G02F 2001/133548
See application file for complete search history.

(56) References Cited

U.S. PATENT DOCUMENTS

| | | | |
|---|---|---|---|
| 2003/0076459 A1* | 4/2003 | Murade ............. | G02F 1/133512 349/111 |
| 2004/0218111 A1* | 11/2004 | Mochizuki ........ | G02F 1/136209 349/44 |
| 2005/0078240 A1* | 4/2005 | Murade ............. | G02F 1/136209 349/110 |
| 2013/0250412 A1* | 9/2013 | Aota .................... | G02B 5/3058 359/485.05 |

FOREIGN PATENT DOCUMENTS

| | | |
|---|---|---|
| JP | 2002-122855 A | 4/2002 |
| JP | 2003-140129 A | 5/2003 |
| JP | 2005-141264 A | 6/2005 |
| JP | 2005-326608 A | 11/2005 |
| JP | 2009-069569 A | 4/2009 |

* cited by examiner

*Primary Examiner* — Jia X Pan
(74) *Attorney, Agent, or Firm* — Oliff PLC

(57) ABSTRACT

An element substrate of an electro-optical device includes, in a peripheral area surrounding a pixel area, a metal wiring provided at one surface side of a first substrate that is a substrate body, and a plurality of second light-shielding layers overlapping with the metal wiring between the first substrate and the metal wiring. A second light-shielding interlayer area overlapping with the metal wiring is present between the plurality of second light-shielding layers. A third light-shielding layer is formed in a manner overlapping in a plan view with the second light-shielding interlayer area between the first substrate and the metal wiring. Surfaces of the second light-shielding layer and the third light-shielding layer at the first substrate side have lower reflectance than a surface of the metal wiring at the first substrate side.

13 Claims, 18 Drawing Sheets

ELECTRO-OPTICAL DEVICE AND ELECTRONIC APPARATUS

BACKGROUND

1. Technical Field

The invention relates to an electro-optical device in which a metal wiring is formed in a peripheral area that surrounds a display area of an element substrate, and an electronic apparatus.

2. Related Art

A transmissive-type electro-optical device, used as a light valve and the like of a projection-type display apparatus, includes an element substrate provided with a pixel electrode having translucency at one surface side of a first substrate having translucency, and a counter substrate provided with a counter electrode having translucency on a surface of a second substrate at the element substrate side, the surface opposing to the one surface side of the first substrate, where an electro-optical layer is provided between the element substrate and the counter substrate. The electro-optical device modulates a light-source light by means of the electro-optical layer for each of the pixels and emits the light-source light while the light-source light incident from the counter substrate side passes through the element substrate and is emitted. At that time, the modulated light may occasionally be reflected by the optical system, the wire-grid polarizing element, and the like that are disposed at the emission side of the modulated light with respect to the element substrate to be incident again as returned light on the element substrate, and the returned light is incident on a semiconductor layer for pixel transistor, then the pixel transistor may occasionally malfunction due to an occurrence of a photocurrent. Thus, a configuration is employed in which a light-absorptive light-shielding layer (the low-reflection layer) is formed between the semiconductor layer and the first substrate in a manner overlapping in a plan view with the semiconductor layer, to prevent the return light from being incident on the semiconductor layer (see JP-A-2009-69569). The electro-optical device described in JP-A-2009-69569 proposes a configuration in which a light-absorptive light-shielding layer (the low-reflection layer) is provided to the metal wiring, to prevent, when light-source light is incident on a peripheral area that surrounds a pixel area in which a plurality of pixels is arrayed, the light-source light from being reflected between metal wirings provided in the peripheral area and emitted.

On the other hand, when the metal wiring is formed in the peripheral area, image light emitted from the element substrate is reflected by the optical system, the wire-grid polarizing element, and the like to be incident again as return light on the element substrate, the return light is reflected by the metal wiring and emits as stray light from the element substrate side, and then a light leakage occurs around the pixel area. The configuration described in JP-A-2009-69569 fails to prevent such a light leakage. Thus, a light-absorptive light-shielding layer (the low-reflection layer) is proposed to fill spaces between the metal wiring and the first substrate in the peripheral area of the element substrate (see JP-A-2003-140129).

SUMMARY

Unfortunately, the light-shielding layer formed to fill spaces as in the configuration described in JP-A-2003-140129 makes cracks readily occur in the light-shielding layer due to the influence of stress generated in the light-shielding layer at the time of film formation, heat treatment, and the like. For this reason, in the low-reflection layer formed to fill spaces in the peripheral area, a light leakage from the cracks in the low-reflection layer needs to be addressed.

Under such circumstances, an object of the invention is to provide an electro-optical device and an electronic apparatus configured to prevent return light incident on the element substrate from being reflected by the metal wiring in the peripheral area and emitted.

In order to achieve the above-described object, one aspect of an electro-optical device of the invention is a transmissive-type electro-optical device that includes: a plurality of pixel electrodes provided in a first substrate, a counter electrode provided in a second substrate opposed to the first substrate, and an electro-optical layer disposed between at least one of the plurality of pixel electrodes and the counter electrode. The electro-optical device in a pixel area provided with the plurality of pixel electrodes includes: a first light-shielding layer, between the first substrate and at least one of the plurality of pixel electrodes, overlapping in a plan view with an inter-pixel area located between adjacent pixel electrodes of the plurality of pixel electrodes, and a semiconductor layer for pixel transistor, between the first light-shielding layer and at least one of the plurality of pixel electrodes, overlapping in a plan view with the first light-shielding layer. The electro-optical device in a peripheral area surrounding the pixel area includes: a metal wiring provided in the first substrate and a plurality of second light-shielding layers provided, between the first substrate and the metal wiring, in a manner overlapping with the metal wiring, and a third light-shielding layer, between the first substrate and the metal wiring, overlapping in a plan view with a second light-shielding interlayer area located between adjacent second light-shielding layers of the plurality of second light-shielding layers. The second light-shielding layer and the third light-shielding layer each include a surface at the first substrate side having a lower reflectance than a surface of the metal wiring at the first substrate side.

According to an aspect to the invention, a light-source light is modulated by means of the electro-optical layer and emits the light-source light while the light-source light incident from the second substrate side passes through the first substrate and is emitted. At that time, even when the modulated light is reflected by the optical system, the wire-grid polarizing element, and the like that are disposed at the emission side of the modulated light with respect to the first substrate to be incident again as return light on the element substrate, the return light is blocked by the first light-shielding layer. Thus, the return light is suppressed from being incident on the semiconductor layer for pixel transistor. This prevents the pixel transistor from malfunctioning due to photocurrent. In the peripheral area that surrounds the pixel area, the second light-shielding layer is provided at the first substrate side with respect to the metal wiring. This can prevent the return light from being reflected by the metal wiring and emitted from the element substrate. Here, the second light-shielding layer being divided into a plurality of portions reduces cracking in the second light-shielding layer due to stress concentration. Although the second light-shielding interlayer area located between adjacent second light-shielding layers overlaps with the metal wiring, the third light-shielding layer provided in a manner overlapping with the second light-shielding interlayer area can prevent the return light that passes through the second light-shielding interlayer area of the second light-shielding layer from being reflected by the metal wiring and emitted from the element substrate. This prevents the returning light incident on the element substrate from being reflected by the metal wiring in the peripheral area and emitted.

The invention may employ an aspect in which the third light-shielding layer is provided between the metal wiring and the second light-shielding layer.

The invention may employ an aspect in which the third light-shielding layer is formed of identical material to a conductive material layer constituting a wiring and an electrode in the pixel area of the element substrate. The invention may, for example, employ an aspect in which the third light-shielding layer includes a capacitor electrode constituting a retention capacitor in the pixel area.

The invention may employ an aspect in which the third light-shielding layer includes a first layer and a second layer that is formed as a layer different from the first layer.

The invention may employ an aspect in which the second light-shielding layer is formed of identical material to the first light-shielding layer. According to the aspect, the first light-shielding layer and the second light-shielding layer can be concurrently formed.

The invention may employ an aspect in which the third light-shielding layer is formed of identical material to a conductive material layer that constitutes a wiring and an electrode in the pixel area. According to the aspect, the third light-shielding layer can be formed in the peripheral area at the same time as the conductive material layer is formed in the pixel area.

The invention may employ an aspect in which the metal wiring is formed of identical material to a conductive material layer constituting a wiring and an electrode in the pixel area of the element substrate. According to the aspect, the metal wiring can be formed in the peripheral area at the same time as the conductive material layer is formed in the pixel area.

The invention may employ an aspect in which a surface of the metal wiring at the first substrate side is formed of a metal film containing aluminum as the primary constituent. According to the aspect, the resistance of the metal wiring can be lowered. In this case as well, the third light-shielding layer and the second light-shielding layer prevent the return light from being reflected by the surface of the metal wiring at the first substrate side and emitted from the element substrate.

The invention may employ an aspect in which the first light-shielding layer and the second light-shielding layer include, at a surface at the first substrate side, a layer formed of any one of a tungsten silicide film, a tungsten film, a titanium-nitride film, and a titanium film.

The electro-optical device according to the invention is used for a variety of electronic apparatuses. In the invention, when an electro-optical device is used for a projection-type display apparatus among electronic apparatuses, the projection-type display apparatus is provided with a light-source unit configured to emit a light supplied to the electro-optical device, and a projection optical system configured to project light modulated by the electro-optical device.

The electronic apparatus (the projection-type display apparatus) according to the invention may employ an aspect in which a wire-grid polarization separation element is provided in an optical path extending from the electro-optical device to the projection optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
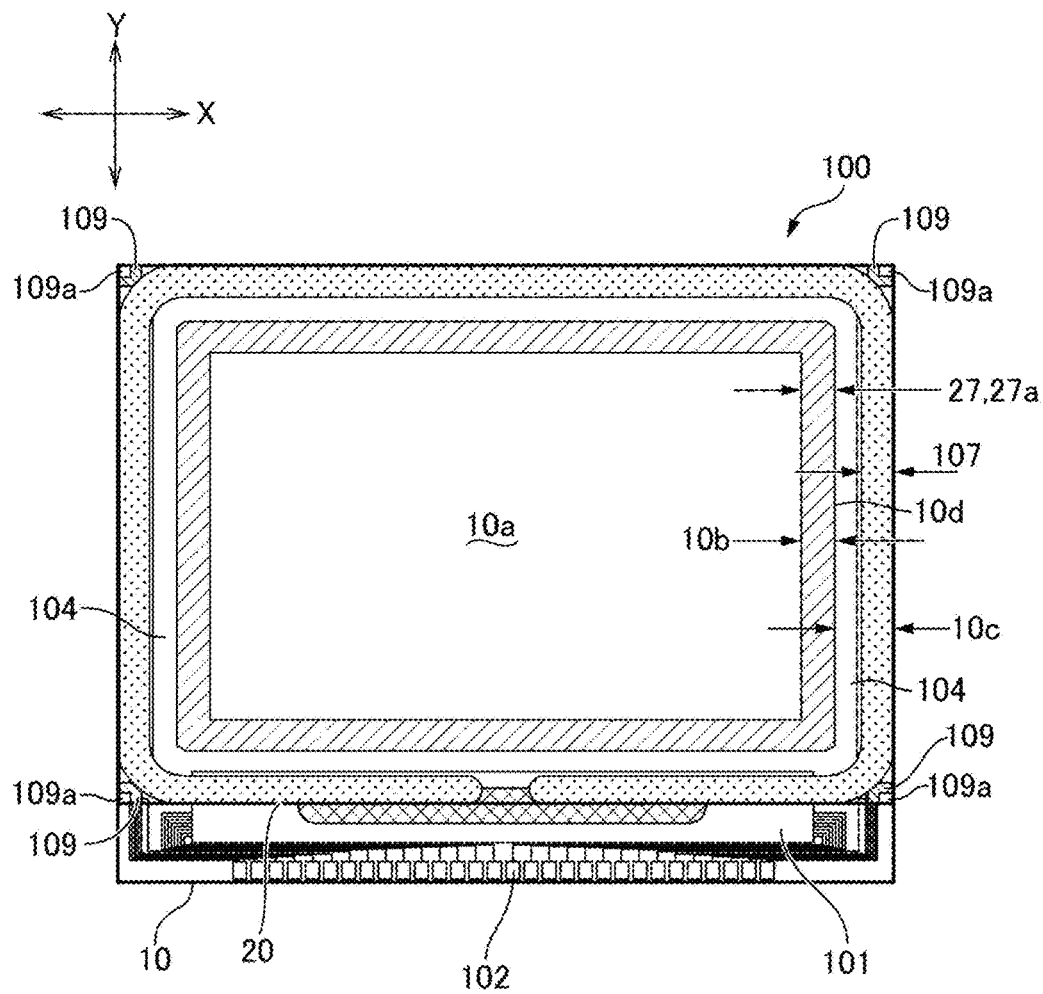
FIG. 1 is a plan view illustrating an electro-optical device according to Exemplary Embodiment 1 of the invention.

An exemplary embodiment of the invention is described below with reference to the accompanying drawings. Note that, in each of the drawings to be referenced in the descriptions below, to make layers, members, and the like recognizable in terms of size in the drawings, each of the layers, members, and the like are illustrated in different scales. Also note that, in the descriptions below, layers formed in the element substrate are described such that the upper layer side and the front surface side represent the sides opposed to the side at which the substrate body is located (the side at which the counter substrate is located), and the bottom layer side represents the side at which the substrate body is located. In addition, in the invention, the "plan view" represents a state viewed from the normal direction with respect to the first substrate 19.

Exemplary Embodiment 1

Configuration of Electro-Optical Device

Figure 2:
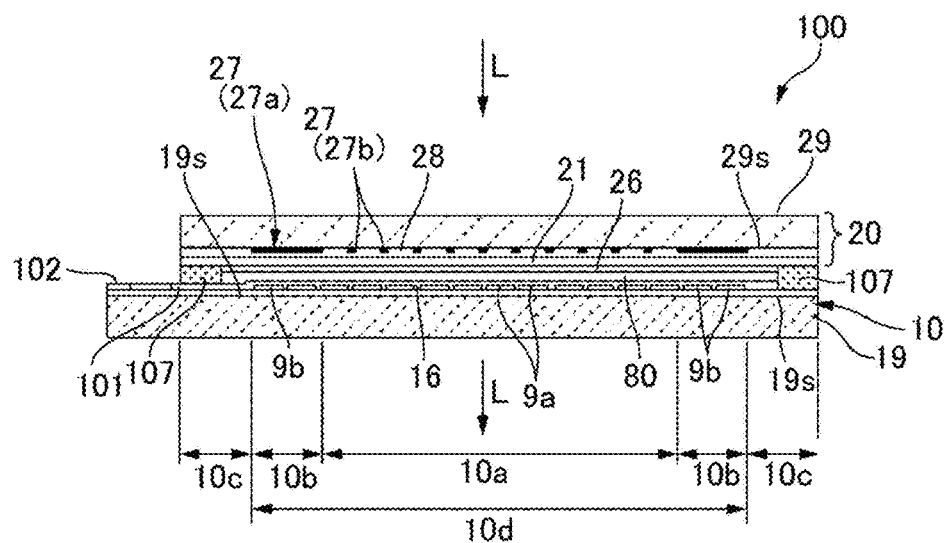
FIG. 2 is a cross-sectional view illustrating the electro-optical device illustrated in FIG. 1.

FIG. 1 is a plan view illustrating an electro-optical device 100 according to Exemplary Embodiment 1 of the invention. FIG. 2 is a cross-sectional view illustrating the electro-optical device 100 illustrated in FIG. 1. As illustrated in FIG. 1 and FIG. 2, the electro-optical device 100 includes an element substrate 10 and a counter substrate 20 bonded together with a sealing material 107 creating a predefined gap, where the element substrate 10 is opposed to the counter substrate 20. The sealing material 107 is provided in a frame-like shape in conformance with the outer edge of the counter substrate 20. An electro-optical layer 80 such as a liquid crystal layer is provided in an area surrounded by the sealing material 107 between the element substrate 10 and the counter substrate 20. Thus, the electro-optical device 100 is formed as a liquid-crystal device. The sealing material 107, which includes an adhesive having a photocurable property or an adhesive having both a photocurable property and a thermosetting property, is made containing a glass fiber, or a gap material such as a glass bead for setting the distance between the substrates to a predefined value. Both the element substrate 10 and the counter substrate 20 are shaped in quadrangular shape, and a pixel area 10d described below, in which a plurality of pixels is arrayed, is provided in a form of a rectangular area in the substantially central portion of the electro-optical device 100, where the pixel area 10d is surrounded by a peripheral area 10c.

The element substrate 10 includes, as a substrate body, a first substrate 19 having translucency such as a quartz substrate or a glass substrate. In the peripheral area 10c on one surface 19s side of the first substrate 19 located at the counter substrate 20 side, a data-line driving circuit 101 and a plurality of terminals 102 are formed along one of the sides of the element substrate 10, and a scanning-line driving circuit 104 is formed along another one of the sides adjacent to this sides. A flexible wiring board (not illustrated) is coupled to the terminal 102. A variety of potentials and a variety of signals are input to the element substrate 10 via the flexible wiring board.

In the pixel area 10d on one surface 19s of the first substrate 19, a plurality of pixel electrodes 9a having translucency formed of an Indium Tin Oxide (ITO) film and the like, and a pixel transistor (not illustrated in FIG. 2) electrically coupled to each of the plurality of pixel electrodes 9a are formed in a matrix shape. A first oriented film 16 is formed on the pixel electrodes 9a at the counter substrate 20 side. The pixel electrodes 9a are covered with the first oriented film 16.

The counter substrate 20 includes, as the substrate body, a second substrate 29 having translucency such as a quartz substrate or a glass substrate. A counter electrode 21 having translucency and formed of an ITO film and the like is formed in the second substrate 29 at one surface 29s side opposed to the element substrate 10. A second oriented film 26 is formed on the counter electrode 21 at the element substrate 10 side. The counter electrode 21, which is formed on the substantially entire surface of the second substrate 29, is covered with the second oriented film 26. At one surface 29s side of the second substrate 29, a light-shielding layer 27 having light-shielding properties and being formed of a resin, a metal, or a metal compound is formed on the counter electrode 21 at the side opposed to the element substrate 10. A protective layer 28 having translucency is formed between the light-shielding layer 27 and the counter electrode 21. The light-shielding layer 27 is formed, for example, as a parting edge 27a in a frame-like shape extending along the outer peripheral edge of the pixel area 10d. The light-shielding layer 27 is also formed as a light-shielding layer 27b in an area overlapping in a plan view with an area located between adjacent pixel electrodes 9a.

The first oriented film 16 and a second oriented film 26 are inorganic oriented films (vertical oriented films) formed of oblique deposition film of $SiO_x$ (x<2), $SiO_2$, $TiO_2$, MgO, $Al_2O_3$, and the like, where liquid crystal molecules having negative dielectric anisotropy used for the electro-optical layer 80 are tilt-oriented. Thus, the liquid crystal molecules form a predefined angle with respect to the element substrate 10 and the counter substrate 20. In this way, the electro-optical device 100 is formed as a liquid-crystal device of vertical alignment (VA) mode.

In the peripheral area 10c of the element substrate 10, inter-substrate conduction electrodes 109 are formed in areas overlapping with corner portions of the counter substrate 20. An inter-substrate conduction material 109a containing conductive particles is disposed at the inter-substrate conduction electrode 109. The counter electrode 21 of the counter substrate 20 is electrically coupled to the inter-substrate conduction electrode 109 of the element substrate 10 via the inter-substrate conduction material 109a. Thus, a common potential is applied to the counter electrode 21 from the inter-substrate conduction electrode 109 of the element substrate 10.

The electro-optical device 100 of the embodiment includes the pixel electrodes 9a and the counter electrode 21 formed of an ITO film (a conductive film having translucency), where the electro-optical device 100 is configured as a transmissive liquid-crystal device. The electro-optical device 100 displays an image in a manner that the light incident from the counter substrate 20 is modulated by the electro-optical layer 80 for each of the pixels while passing through the element substrate 10 and being emitted as indicated by an arrow L in FIG. 2.

Configuration of Pixel Area 10b and the Like

Figure 3:
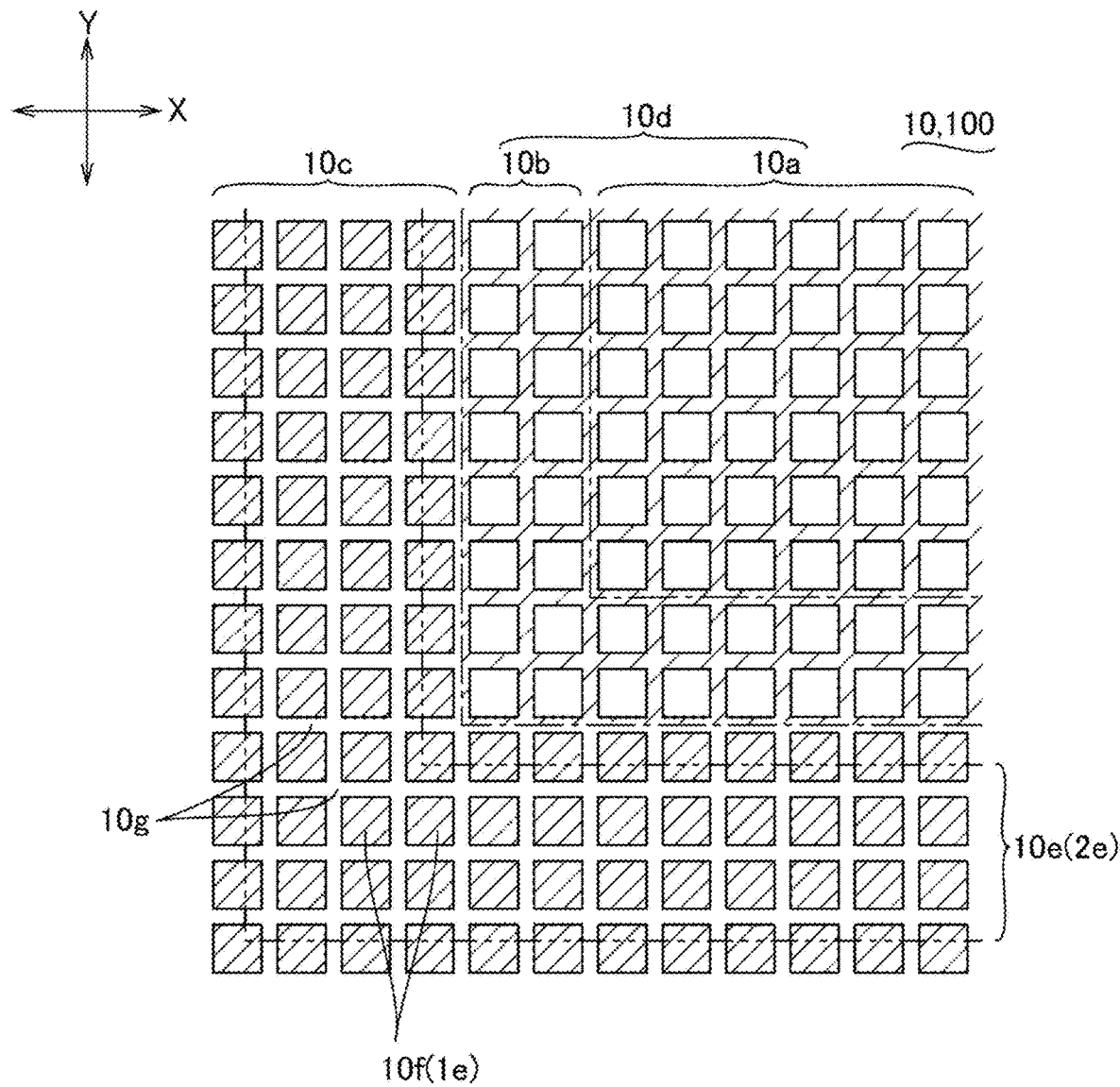
FIG. 3 is an explanatory view schematically illustrating a planar configuration of the end portion of the pixel area illustrated in FIG. 1.

FIG. 3 is an explanatory view schematically illustrating a planar configuration of the end portion of the pixel area 10d illustrated in FIG. 1. As illustrated in FIG. 1, FIG. 2, and FIG. 3, in the element substrate 10, a dummy pixel electrode 9b, which is concurrently formed with the pixel electrodes 9a, is formed in a dummy pixel area 10b that overlaps in a plan view with the parting edge 27a illustrated in FIG. 1 and the like among the pixel areas 10d. The dummy pixel area 10b does not directly contribute to the display. A display area 10a is formed, in the pixel area 10d, by the area surrounded by the inner edge of the parting edge 27a. In the embodiment, the dummy pixel area 10b has the same basic configuration as the display area 10a, and a common potential is applied to the dummy pixel electrode 9b. Thus, the light-source light is not subjected to the modulation due to the block of the source light passing through the dummy pixel area 10b.

Specific Configuration of Pixel

Figure 4:
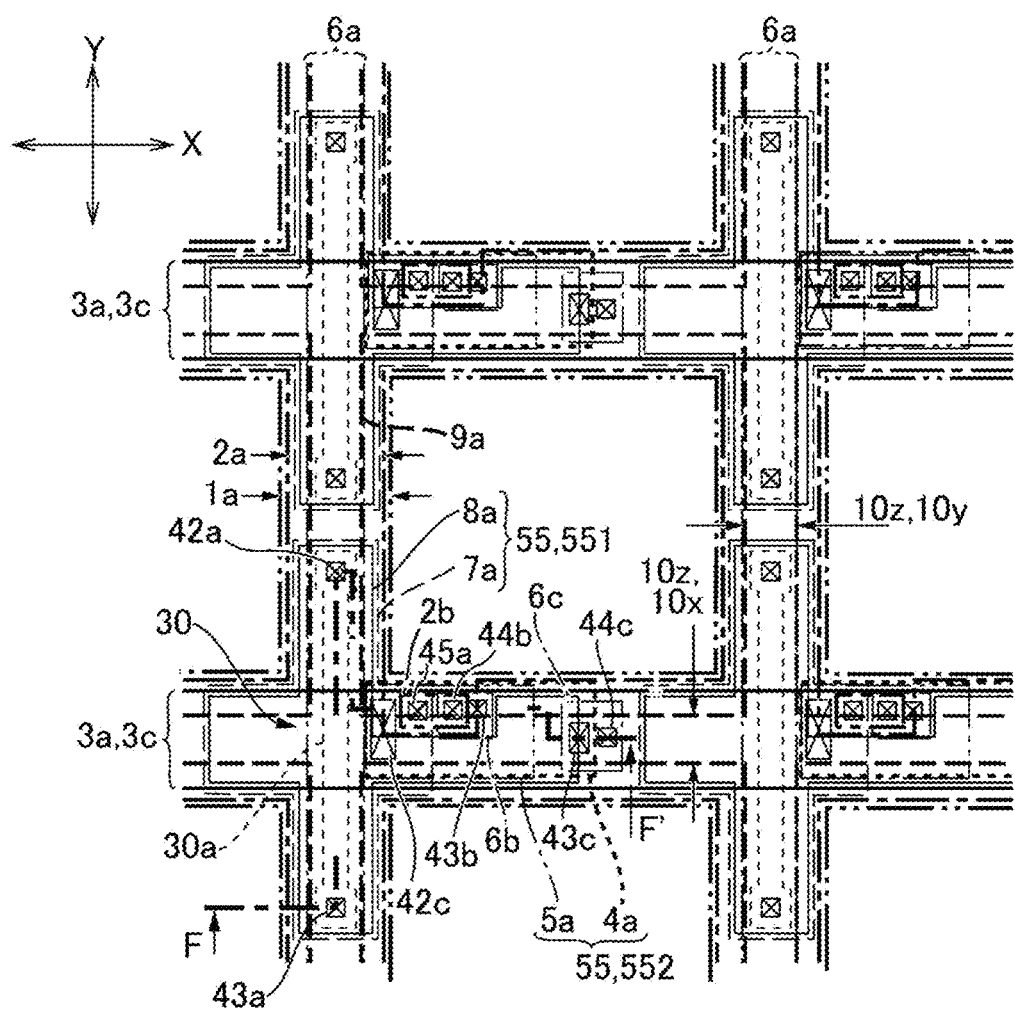
FIG. 4 is a plan view illustrating an example of a plurality of adjacent pixels in the element substrate illustrated in FIG. 1.
Figure 5:
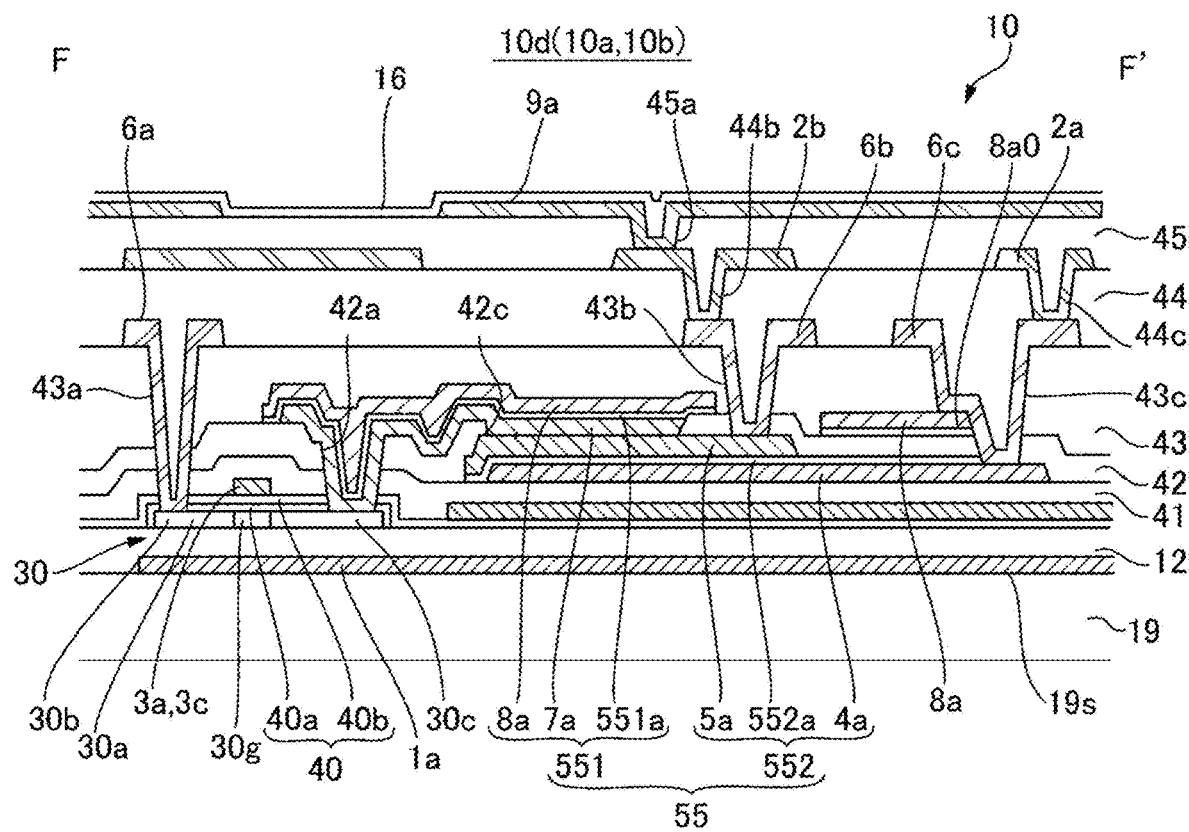
FIG. 5 is a cross-sectional view taken along a line F-F' of the element substrate illustrated in FIG. 4.
Figure 6:
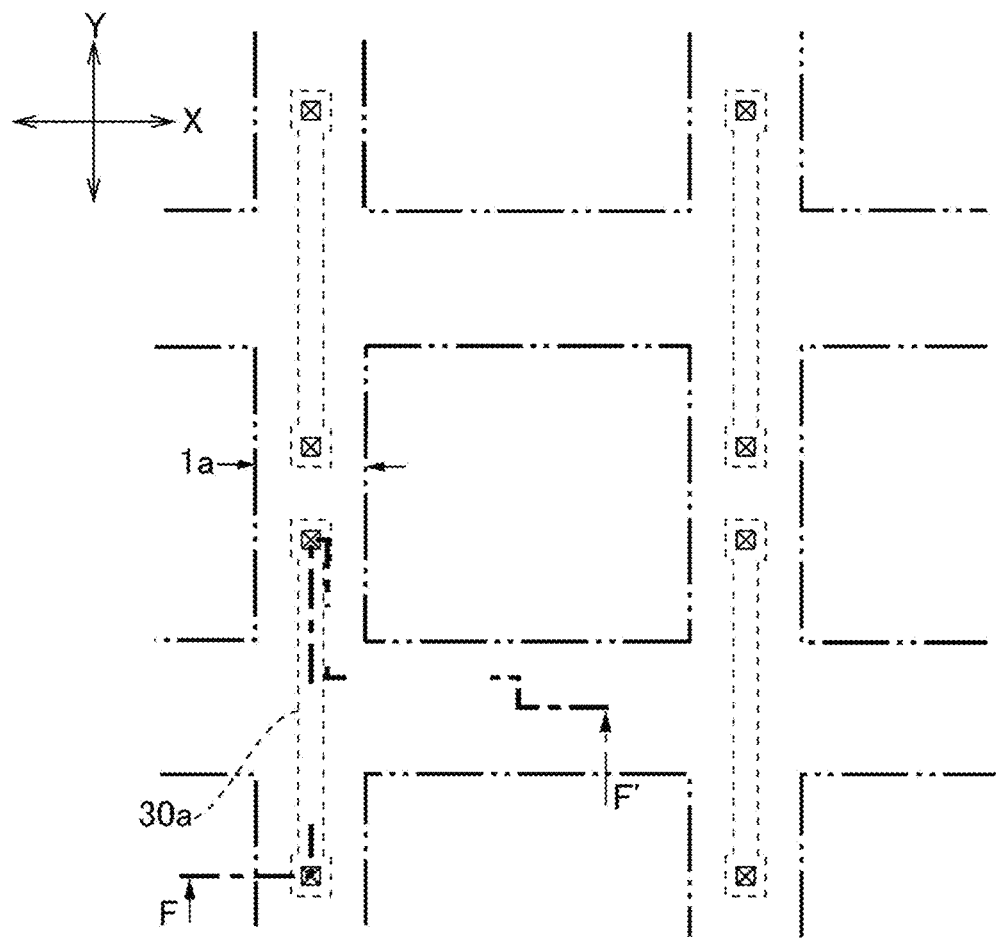
FIG. 6 is an explanatory view illustrating a planar configuration of the first light-shielding layer illustrated in FIG. 5.
Figure 7:
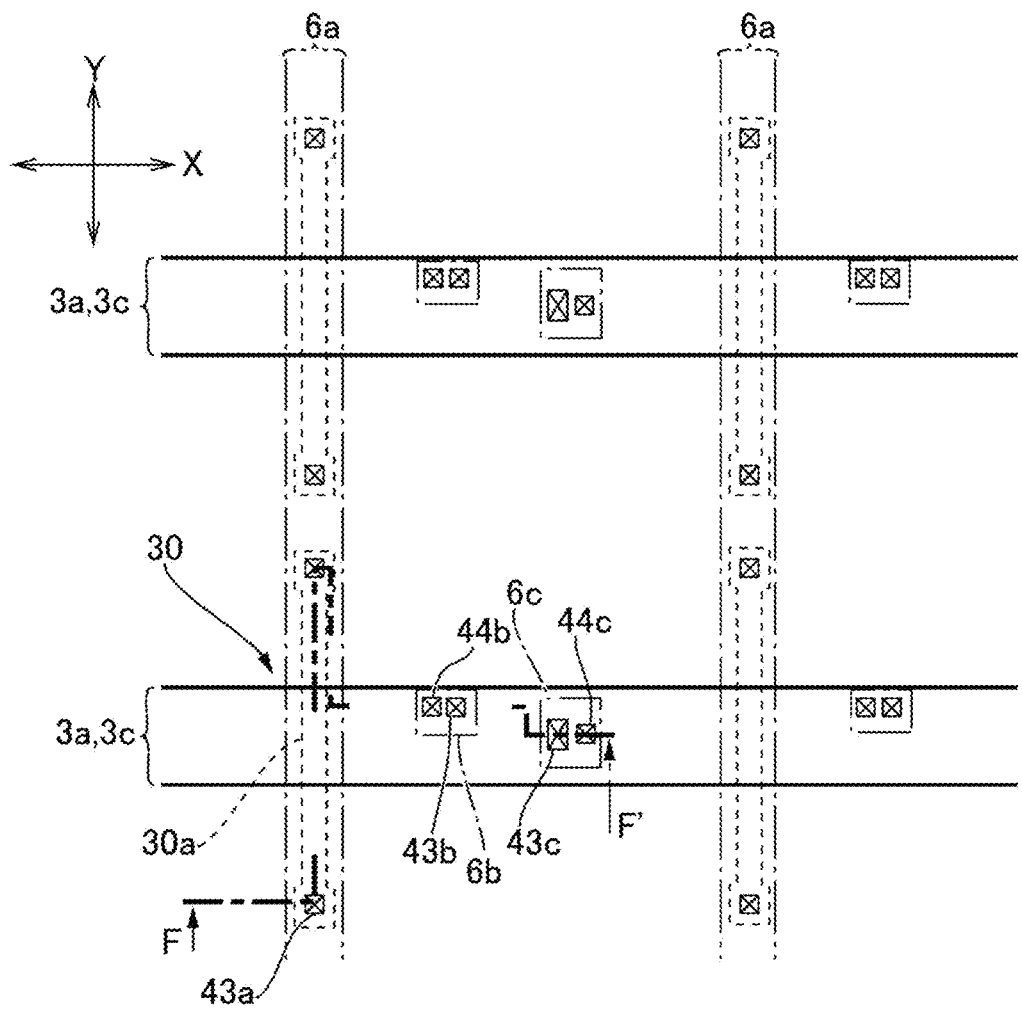
FIG. 7 is an explanatory diagram illustrating a planar configuration of the pixel transistor illustrated in FIG. 5.
Figure 8:
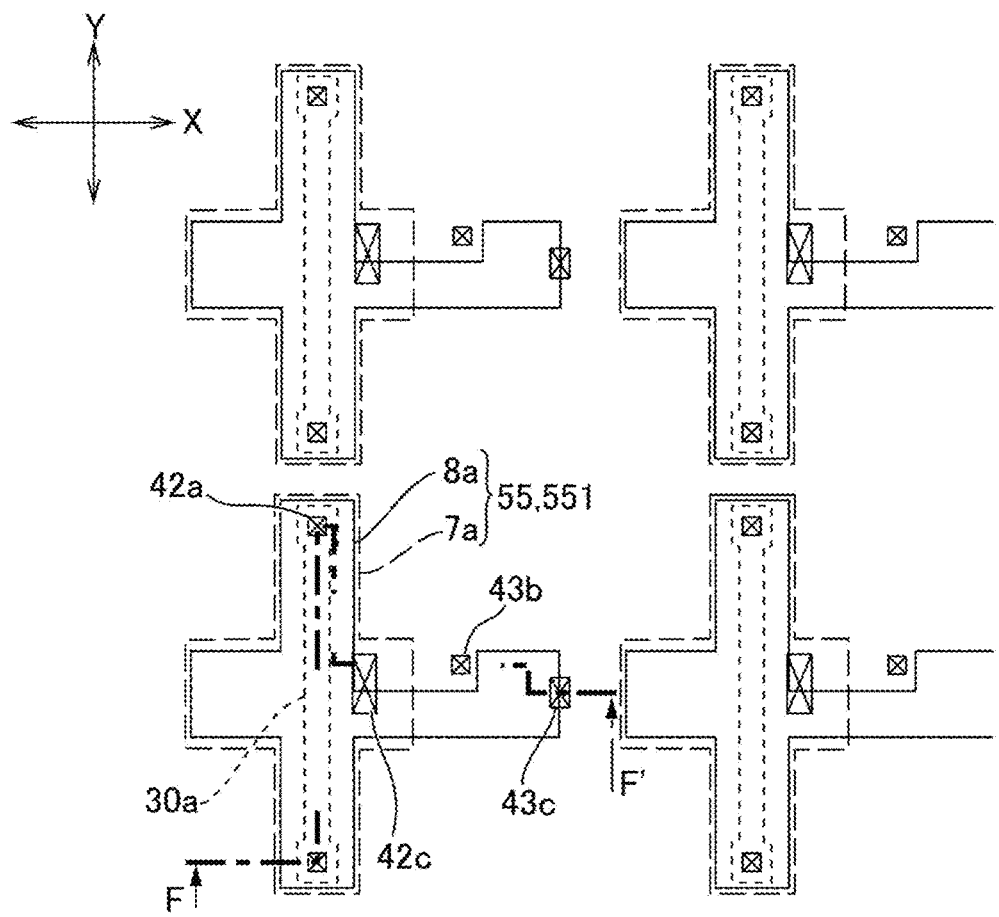
FIG. 8 is an explanatory view illustrating a planar configuration of the first retention capacitor illustrated in FIG. 5.
Figure 9:
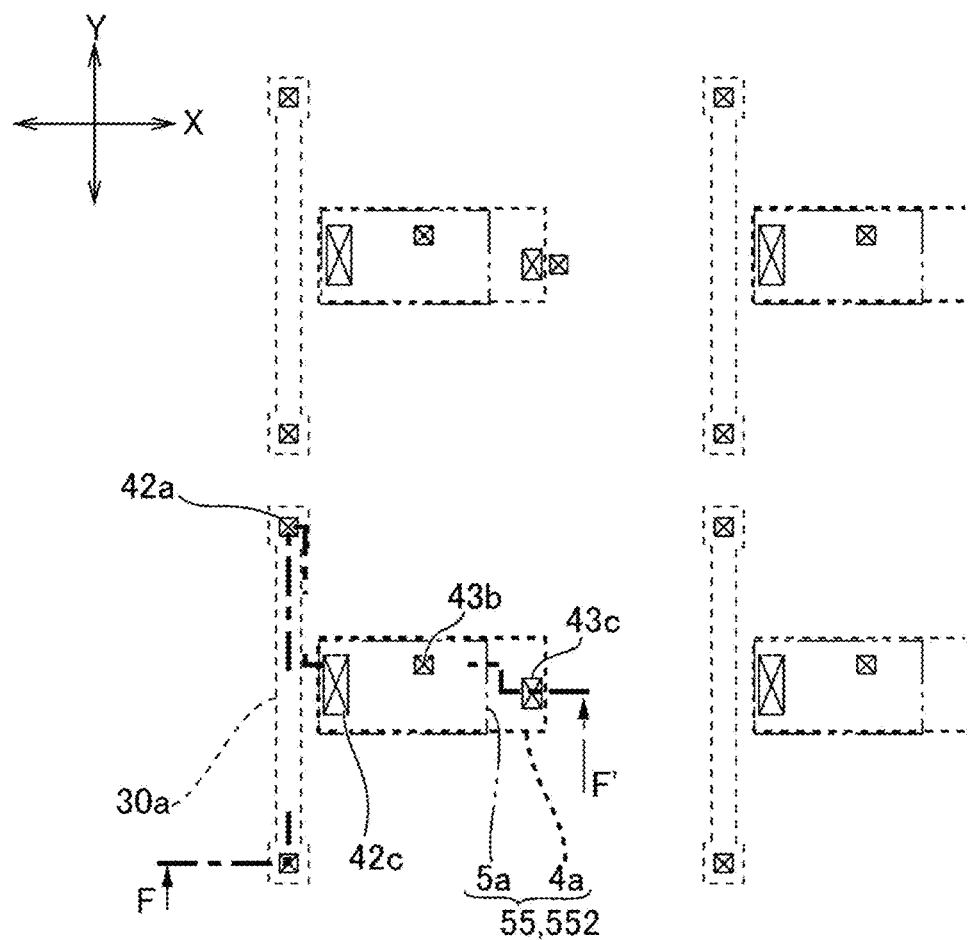
FIG. 9 is an explanatory view illustrating a planar configuration of the second retention capacitor illustrated in FIG. 5.
Figure 10:
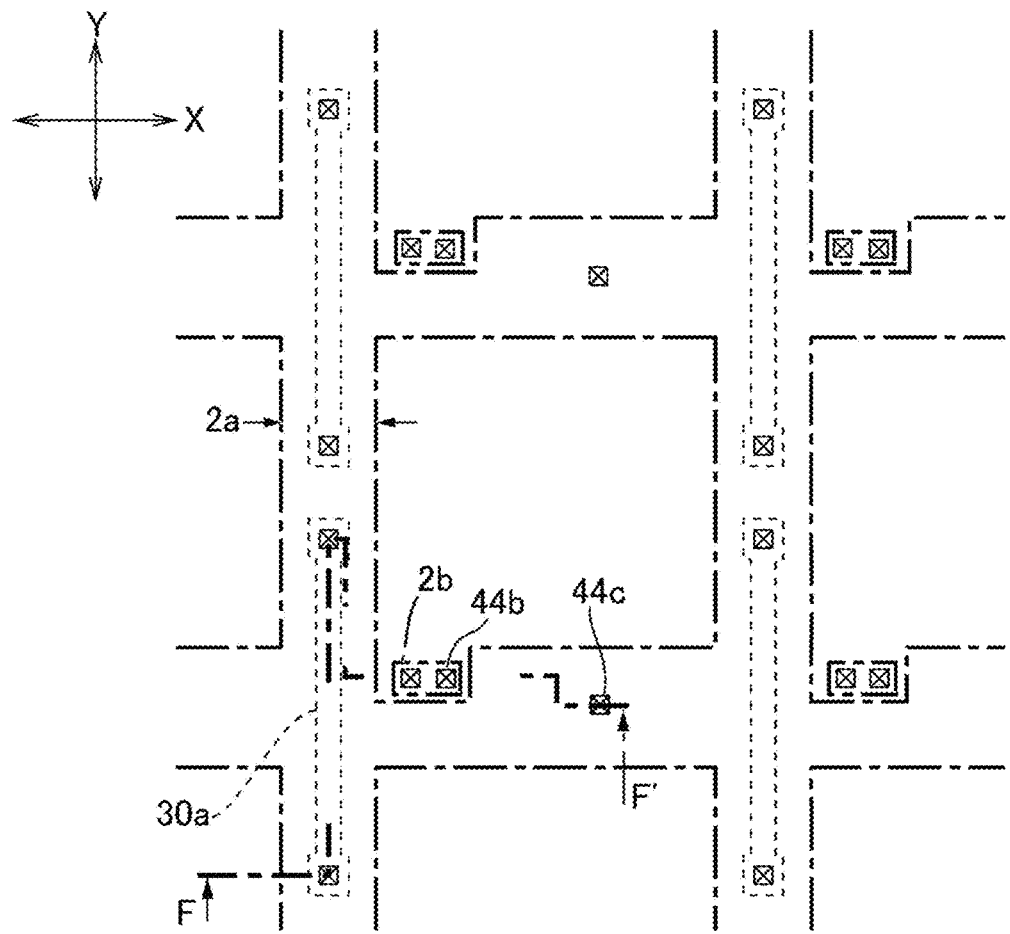
FIG. 10 is an explanatory diagram illustrating a planar configuration of a capacitor line illustrated in FIG. 5.
Figure 11:
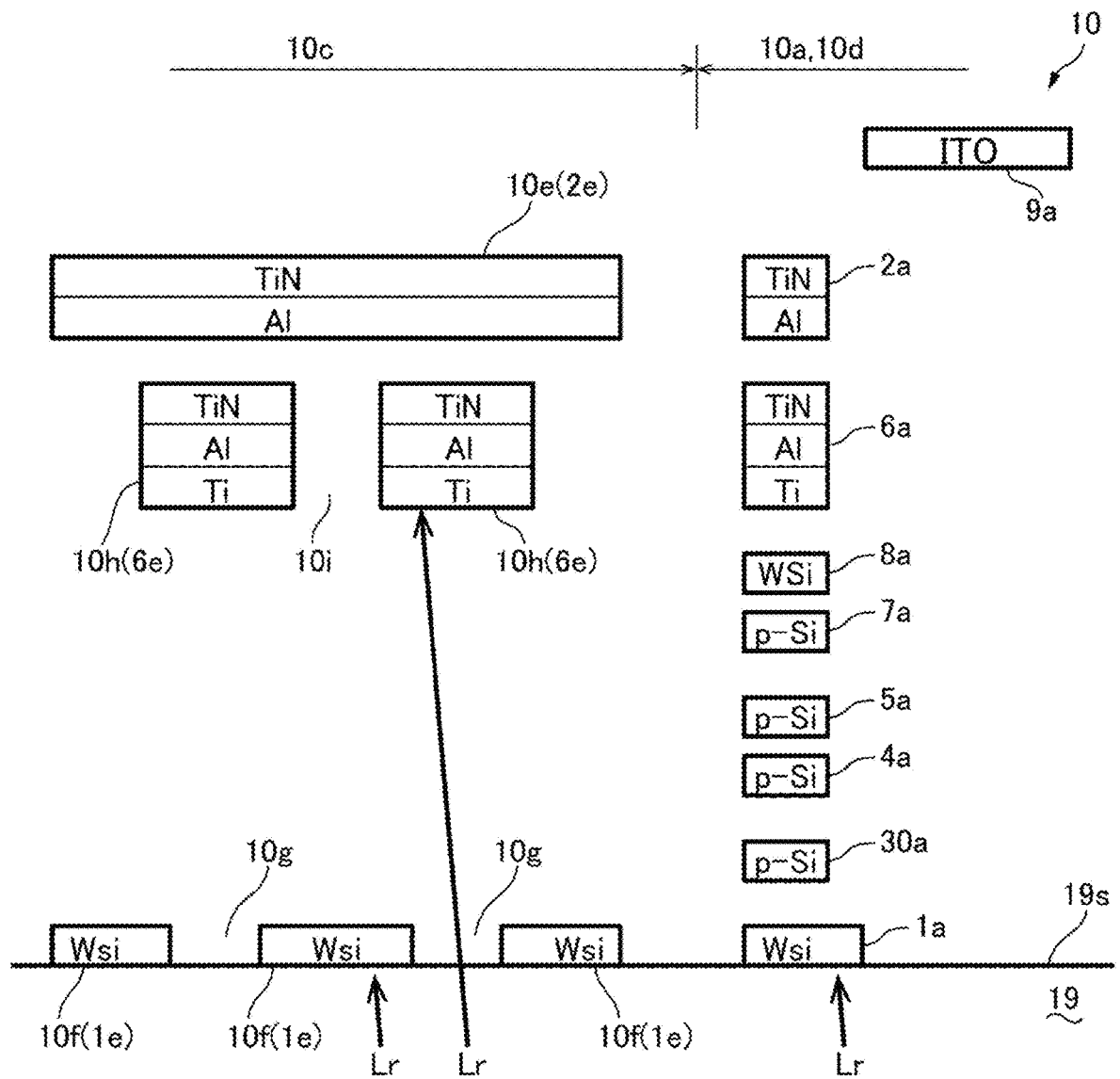
FIG. 11 is an explanatory view illustrating materials that constitute the layers illustrated in FIG. 5.

FIG. 4 is a plan view illustrating an example of a plurality of adjacent pixels in the element substrate 10 illustrated in FIG. 1. FIG. 5 is a cross-sectional view taken along a line F-F' of the element substrate 10 illustrated in FIG. 4. FIG. 6 is an explanatory view illustrating a planar configuration of a first light-shielding layer 1a illustrated in FIG. 5. FIG. 7 is an explanatory diagram illustrating a planar configuration of the pixel transistor 30 illustrated in FIG. 5. FIG. 8 is an explanatory diagram illustrating a planar configuration of the first retention capacitor 551 illustrated in FIG. 5. FIG. 9 is an explanatory diagram illustrating a planar configuration of the second retention capacitor 552 illustrated in FIG. 5. FIG. 10 is an explanatory diagram illustrating a planar configuration of the capacitor line 2a illustrated in FIG. 5. FIG. 11 is an explanatory diagram illustrating materials constituting the layers illustrated in FIG. 5. In FIG. 6 to FIG. 10, semiconductor layers 30a and F-F' lines are also illustrated as references of the positions of the layers, and contact holes relating to the electrical connections of the electrodes and the like illustrated in the drawings, are illustrated. Note that, in FIG. 4 and FIG. 6 to FIG. 10, layers are indicated by the lines below.

First light-shielding layer 1a being indicated by thick two-dot chain line

Semiconductor layer 30a being indicated by thin dotted line

Scanning line 3a and Gate electrode 3c being indicated by thick solid lines

Data line 6a, and Relay electrodes 6b and 6c being indicated by thin dotted lines First capacitor electrode 7a being indicated by thin broken line Second capacitor electrode 8a being indicated by thin solid line Third capacitor electrode 4a being indicated by thick dotted line Fourth capacitor electrode 5a being indicated by thin two-dot chain line Capacitor line 2a being indicated by thick dotted line Contact holes being indicated by thick solid lines Note that, in FIG. 4 and FIG. 6 to FIG. 10, for the layers in which the end portions overlap in a plan view with each other, the end portions are shifted to make the shape and the like of the layers easily recognizable.

As illustrated in FIG. 4 and FIG. 5, the pixel electrode 9a is formed at each of the plurality of pixels on the surface of the element substrate 10 opposed to the counter substrate 20. The first light-shielding layer 1a, a scanning line 3a, a data line 6a, and a capacitor line 2a are formed in an area overlapping in a plan view with an inter-pixel area 10z located between adjacent pixel electrodes 9a. In the embodiment, the first light-shielding layer 1a extends along a first inter-pixel area 10x extending in the first direction X and a second inter-pixel area 10y extending in the second direction Y in the inter-pixel area 10z (see FIG. 6). The scanning line 3a extends along the first inter-pixel area 10x. The data line 6a extends along the second inter-pixel area 10y (see FIG. 7). The capacitor line 2a extends along both the first inter-pixel area 10x and the second inter-pixel area 10y (see FIG. 10). Note that the first light-shielding layer 1a, the scanning line 3a, the data line 6a, and the capacitor line 2a have light-shielding properties. Thus, the area where the first light-shielding layer 1a, the scanning line 3a, the data line 6a, and the capacitor line 2a are formed is a light-shielding area through which light does not pass. The area surrounded by the light-shielding area is an aperture area through which light passes (the translucent area). A first retention capacitor 551 is formed in an area overlapping in a plan view with the first inter-pixel area 10x and the second inter-pixel area 10y (see FIG. 8). A retention capacitor 552 is formed in an area overlapping in a plan view with the second inter-pixel area 10y (see FIG. 9).

Hereinafter, a cross-sectional configuration and the like of the element substrate 10 are described referring to FIG. 5 and referring appropriately to FIG. 6 to FIG. 11. As illustrated in FIG. 5, on one surface 19s of the first substrate 19, interlayer insulating films 12, 41, 42, 43, 44, and 45 are sequentially stacked using an insulating film having translucency such as silicon oxide film. The pixel electrode 9a is formed on the surface of the interlayer insulating film 45, which is opposed to the first substrate 19. The surfaces of the interlayer insulating films 43, 44, and 45, which are opposed to the first substrate 19, are planarized by planarization treatment such as CMP processing.

Between the first substrate 19 and the interlayer insulating film 12 and between the first substrate 19 and the pixel electrode 9a is formed the first light-shielding layer 1a having light absorbency illustrated in FIG. 6. The first light-shielding layer 1a is formed of a polysilicon film, a metal silicide film, a metal film, a metal compound film, and the like. In the embodiment, the first light-shielding layer 1a is formed of a tungsten silicide film (WSi) (see FIG. 11).

The semiconductor layer 30a (the semiconductor layer for pixel transistor) illustrated in FIG. 7 is formed between the interlayer insulating film 12 and the interlayer insulating film 41 and between the first light-shielding layer 1a and the pixel electrode 9a. The semiconductor layer 30a extends in the second direction Y in an area overlapping in a plan view with the first light-shielding layer 1a. The semiconductor layer 30a is formed of a polysilicon film (p-Si) (see FIG. 11). The surface of the semiconductor layer 30a, which is opposed to the first substrate 19, is covered with a gate insulating layer 40. The gate insulating layer 40 is constituted by a two-layer configuration of a first gate insulating layer 40a formed of a silicon oxide film formed by thermal oxidization of the semiconductor layer 30a and a second gate insulating layer 40b formed of a silicon oxide film formed by low pressure CVD method.

Between the gate insulating layer 40 and the interlayer insulating film 41 is formed the gate electrode 3c illustrated in FIG. 7. The gate electrode 3c extends in the first direction X to intersect with the semiconductor layer 30a and overlaps with the substantially central portion in the longitudinal direction of the semiconductor layer 30a via the gate insulating layer 40. In the embodiment, the gate electrode 3c is formed of a part of the scanning line 3a extending in the first direction X, and the scanning line 3a (the gate electrode 3c) overlaps in a plan view with the first light-shielding layer 1a. The scanning line 3a is formed of a polysilicon film, a metal silicide film, a metal film, a metal compound film, and the like. In the embodiment, the scanning line 3a is formed of a conductive polysilicon film (p-Si) (see FIG. 11). Note that the first light-shielding layer 1a may be formed to extend only in the first direction X to form the scanning line 3a. In this case, the first light-shielding layer 1a (the scanning line 3a) is electrically coupled to the gate electrode 3c via a contact hole that penetrates the gate insulating layer 40 and the interlayer insulating film 12. A pixel transistor 30 formed as above has an Lightly Doped Drain (LDD) configuration. Thus, a source area 30b and a drain area 30c each have a low concentration area at both sides of a channel area 30g, and each have a high concentration area in an area which is adjacent, at the opposite side to the channel area 30g, to the low concentration area.

Between the interlayer insulating film 43 and the interlayer insulating film 44 and between the gate electrode 3c and the pixel electrode 9a, the data line 6a, and the relay electrodes 6b and 6c that are illustrated in FIG. 7 are formed using the same conductive materials. The data line 6a, and the relay electrodes 6b and 6c overlap in a plan view with the first light-shielding layer 1a. The data line 6a is electrically coupled to the source area 30b via a contact hole 43a that penetrates the interlayer insulating films 41, 42, and 43. The data line 6a is formed of a polysilicon film, a metal silicide film, a metal film, a metal compound film, and the like. In the embodiment, the data line 6a is constituted by a three-layer configuration in which a titanium film (Ti), an aluminum film (Al), and a titanium nitride film (TiN) are sequentially stacked from the bottom layer side (see FIG. 11). Note that the aluminum film (Al) used for the data line 6a, the capacitor line 2a described below, and the like is defined as including a metal film (an alloy film) containing aluminum as the primary constituent.

Between the interlayer insulating film 42 and the interlayer insulating film 43, the first capacitor electrode 7a illustrated in FIG. 8, a dielectric layer 551a, and the second capacitor electrode 8a illustrated in FIG. 8 are sequentially stacked to form the first retention capacity 551. The first capacitor electrode 7a and the second capacitor electrode 8a overlap in a plan view with the first light-shielding layer 1a. The first capacitor electrode 7a and the second capacitor electrode 8a are formed of a polysilicon film, a metal silicide film, a metal film, a metal compound film, and the like. In the embodiment, the first capacitor electrode 7a is formed of a conductive polysilicon film (p-Si) and the second capacitor electrode 8a is formed of a tungsten silicide film (WSi) (see FIG. 11). A silicon compound such as a silicon oxide film or a silicon nitride film can be used for the dielectric layer 551a, and additionally, a dielectric layer having high dielectric constant such as an aluminum oxide film, a titanium oxide film, a tantalum oxide film, a niobium oxide film, a hafnium oxide film, a lanthanum oxide film, and a zirconium oxide film can be used as well.

Between the interlayer insulating film 41 and the interlayer insulating film 42, the third capacitor electrode 4a illustrated in FIG. 9, a dielectric layer 552a, and the fourth capacitor electrode 5a illustrated in FIG. 9 are sequentially stacked to form the second retention capacitor 552. The third capacitor electrode 4a and the fourth capacitor electrode 5a overlap in a plan view with the first light-shielding layer 1a. The third capacitor electrode 4a and the fourth capacitor electrode 5a are formed of a polysilicon film, a metal silicide film, a metal film, a metal compound film, and the like. In the embodiment, the third capacitor electrode 4a and the fourth capacitor electrode 5a are formed of a conductive polysilicon film (p-Si) (see FIG. 11). A silicon compound such as a silicon oxide film or a silicon nitride film can be used for the dielectric layer 552a, and additionally, a dielectric layer having high dielectric constant such as an aluminum oxide film, a titanium oxide film, a tantalum oxide film, a niobium oxide film, a hafnium oxide film, a lanthanum oxide film, and a zirconium oxide film can be used as well.

The first capacitor electrode 7a is electrically coupled to the drain area 30c via a contact hole 42a that penetrates the interlayer insulating films 41 and 42, and the gate insulating layer 40. The first capacitor electrode 7a is electrically coupled to the fourth capacitor electrode 5a via a contact hole 42c that penetrates the interlayer insulating film 42. The relay electrode 6b is electrically coupled to the fourth capacitor electrode 5a via a contact hole 43b that penetrates the interlayer insulating film 43. The relay electrode 6c is electrically coupled to the third capacitor electrode 4a via a contact hole 43c that penetrates the interlayer insulating films 42 and 43. The contact hole 43c exposes a part of the second capacitor electrode 8a. The relay electrode 6c is electrically coupled, at the contact hole 43c, to the second capacitor electrode 8a and the third capacitor electrode 4a.

Thus, the first retention capacitor 551 is electrically connected in parallel to the second retention capacitor 552.

Between the interlayer insulating film 44 and the interlayer insulating film 45, the capacitor line 2a and the relay electrode 2b that are illustrated in FIG. 10 are formed using the same conductive materials. The capacitor line 2a and the relay electrode 2b overlap in a plan view with the first light-shielding layer 1a. A common potential Vcom is applied to the capacitor line 2a. The capacitor line 2a and the relay electrode 2b are formed of a polysilicon film, a metal silicide film, a metal film, a metal compound film, and the like. In the embodiment, the capacitor line 2a and the relay electrode 2b are constituted by a two-layer configuration in which an aluminum film (Al) and a titanium nitride film (TiN) are sequentially stacked from the bottom layer side (see FIG. 11). The capacitor line 2a is electrically coupled to the relay electrode 6c via a contact hole 44c that penetrates the interlayer insulating film 44. The relay electrode 2b is electrically coupled to the relay electrode 6b via a contact hole 44b that penetrates the interlayer insulating film 44.

The pixel electrode 9a is formed on the surface of the interlayer insulating film 45, which is opposed to the first substrate 19. The pixel electrode 9a is electrically coupled to the relay electrode 2b via a contact hole 45a that penetrates the interlayer insulating film 45 at a location overlapping in a plan view with the first light-shielding layer 1a. Thus, the pixel electrode 9a is electrically coupled to the drain area 30c via the relay electrode 2b, the relay electrode 6b, the fourth capacitor electrode 5a, and the first capacitor electrode 7a.

The electro-optical device 100 formed as described above modulates light-source light by means of the electro-optical layer 80 and emits the light-source light while the light-source light L incident from the counter substrate 20 side passes through the element substrate 10 and is emitted. At that time, the light advancing from the counter substrate 20 side to the semiconductor layer 30a for pixel transistor is blocked by the capacitor line 2a and/or the data line 6a. As illustrated in FIG. 11, even when the modulated light is reflected by the optical system, the wire-grid polarizing element, and the like that are disposed at the emission side of the modulated light with respect to the element substrate 10 to be incident again as return light Lr on the element substrate 10, the return light Lr is blocked by the first light-shielding layer 1a. Thus, the return light Lr is suppressed from being incident on the semiconductor layer 30a for pixel transistor. This prevents the pixel transistor 30 from malfunctioning due to photocurrent.

Detailed Configuration of Peripheral Area 10c

Figure 12:
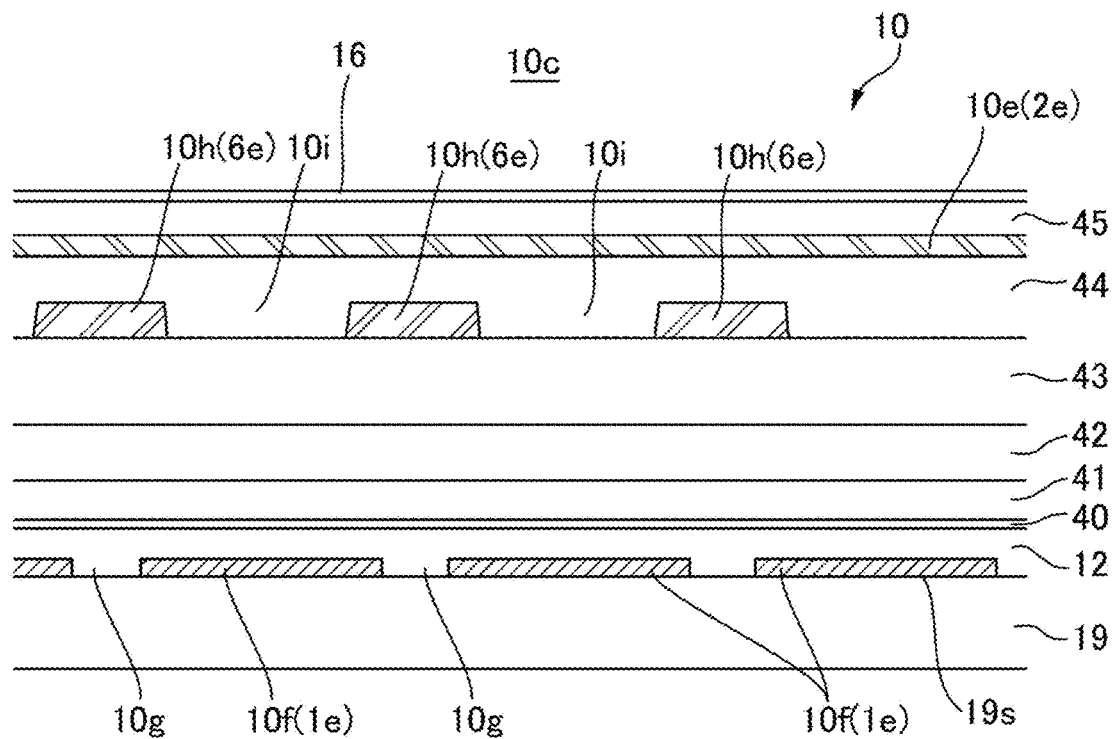
FIG. 12 is an explanatory view illustrating a cross section of the peripheral area illustrated in FIG. 1.
Figure 13:
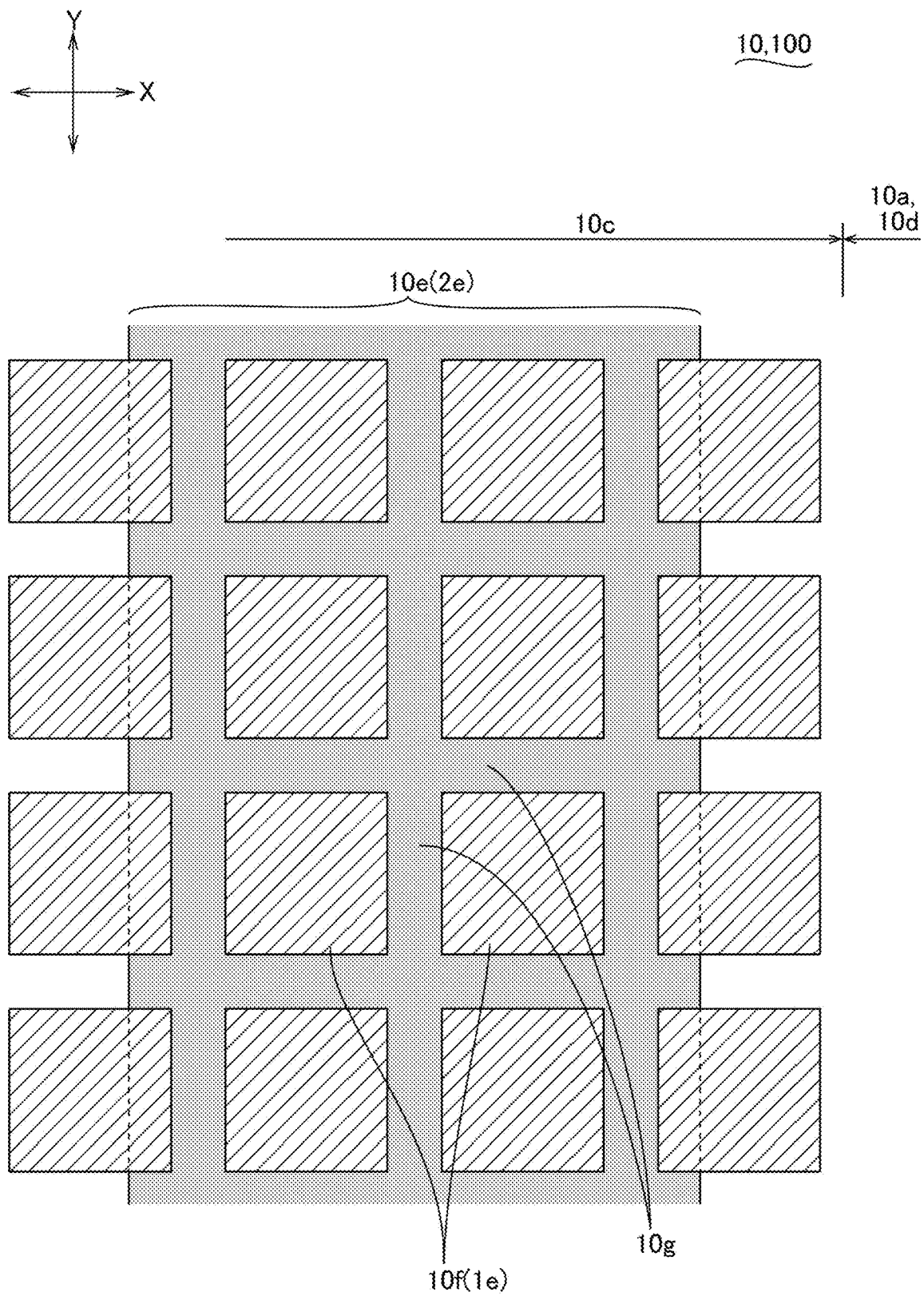
FIG. 13 is an explanatory view illustrating a planar configuration of the metal wiring and the second light-shielding layer illustrated in FIG. 12.
Figure 14:
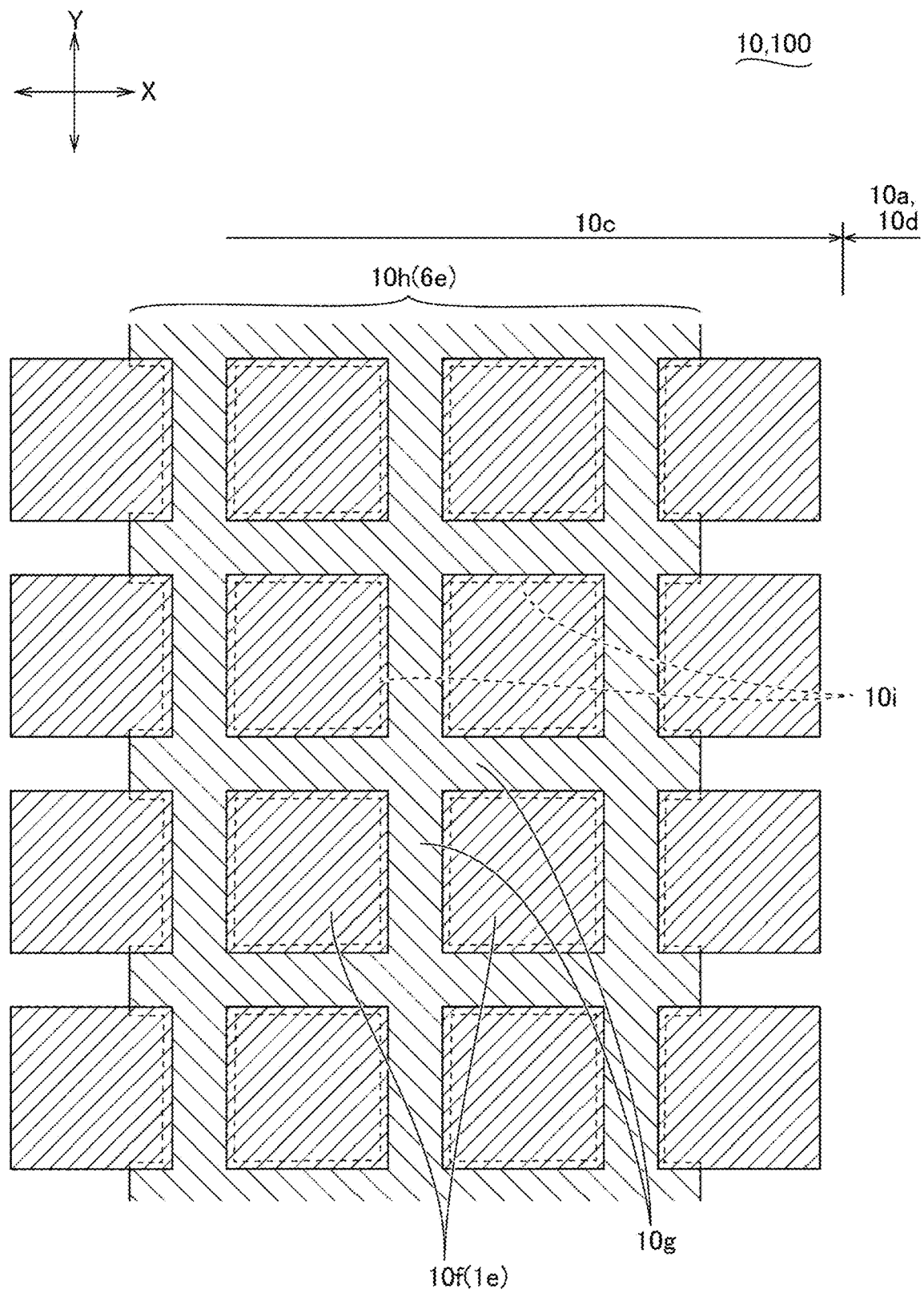
FIG. 14 is an explanatory view illustrating a planar configuration of the third light-shielding layer and the second light-shielding layer that are illustrated in FIG. 12.

FIG. 12 is an explanatory view illustrating a cross section of the peripheral area 10c illustrated in FIG. 1. FIG. 13 is an explanatory view illustrating a planar configuration of a metal wiring 10e and the second light-shielding layer 10f that are illustrated in FIG. 12. FIG. 14 is an explanatory view illustrating a planar configuration of the third light-shielding layer 10h and the second light-shielding layer 10f that are illustrated in FIG. 12. Note that FIG. 13 and FIG. 14 illustrate the peripheral area 10c of the element substrate 10 as viewed from the side opposed to the counter substrate 20.

As illustrated in FIG. 3, FIG. 12, and FIG. 13, in the peripheral area 10c surrounding the pixel area 10d, there is formed a metal wiring 10e at the one surface 19s side of the first substrate 19. In the embodiment, the metal wiring 10e surrounds the pixel area 10d, extending in both the first direction X and the second direction Y along the outer edge of the pixel area 10d.

In the embodiment, the metal wiring 10e is a wiring 2e formed using the same conductive material as the capacitor line 2a between the interlayer insulating film 44 and the interlayer insulating film 45, which supplies the common potential Vcom to the capacitor line 2a and the like. The metal wiring 10e is constituted by, similar to the capacitor line 2a, a two-layer configuration in which an aluminum film (Al) and a titanium nitride film (TiN) are sequentially stacked from the bottom layer side (see FIG. 11).

Between the first substrate 19 and the metal wiring 10e in the peripheral area 10c is formed a second light-shielding layer 10f having light absorbability. Here, the second light-shielding layer 10f is formed over the entire area of the area that overlaps with the metal wiring 10e, and the second light-shielding layer 10f is divided into a plurality of rectangular island-like areas. Thus, between adjacent second light-shielding layers 10f is present a second light-shielding interlayer area 10g formed in a slit-like shape. Thus, the second light-shielding layer 10f overlaps in a plan view with a part of the metal wiring 10e, whereas the other part of the metal wiring 10e overlaps with the second light-shielding interlayer area 10g. The surface of the second light-shielding layer 10f at the first substrate 19 side has lower reflectance than the surface of the metal wiring 10e at the first substrate 19 side.

As illustrated in FIG. 12 and FIG. 14, a third light-shielding layer 10h is formed between the first substrate 19 and the metal wiring 10e in a manner overlapping in a plan view with the second light-shielding interlayer area 10g. Thus, when the element substrate 10 is viewed from the side opposed to the counter substrate 20, the metal wiring 10e, which is covered with the second light-shielding layer 10f and the third light-shielding layer 10h, is not exposed. The surface of the third light-shielding layer 10h at the first substrate 19 side has lower reflectance than the surface of the metal wiring 10e at the first substrate 19 side.

As understood by the comparison of FIG. 5 and FIG. 12, in the embodiment, the second light-shielding layer 10f, which is a layer 1e formed between the first substrate 19 and the interlayer insulating film 12 using the same conductive material as the first light-shielding layer 1a, is formed of a tungsten silicide film (WSi) (see FIG. 11). Thus, the surface of the second light-shielding layer 10f at the first substrate 19 side has lower reflectance than the surface of the metal wiring 10e at the first substrate 19 side.

The third light-shielding layer 10h, which is a layer 6e formed between the interlayer insulating film 43 and the interlayer insulating film 44 using the same conductive material as the data line 6a, is constituted by a three-layer configuration in which a titanium film (Ti), an aluminum film (Al), and a titanium nitride film (TiN) are sequentially stacked (see FIG. 11) from the bottom layer side. Thus, the surface of the third light-shielding layer 10h at the first substrate 19 side has lower reflectance than the surface of the metal wiring 10e at the first substrate 19 side. In the embodiment, the third light-shielding layer 10h formed in a lattice shape to extend along the second light-shielding interlayer area 10g makes the third light-shielding layer 10h form an opening 10i in an area where the metal wiring 10e overlaps with the second light-shielding layer 10f.

Thus, as illustrated in FIG. 11, even when the modulated light is reflected by the optical system, the wire-grid polarizing element, and the like that are disposed at the emission side of the modulated light with respect to the element substrate 10 to be incident as return light Lr on the peripheral area 10c of the element substrate 10, the return light Lr is blocked by the second light-shielding layer 10f. Thus, the return light Lr can be suppressed from being reflected by the metal wiring 10e and emitted from the element substrate 10.

Note that the second light-shielding layer 10f divided into a plurality of areas on either side of the second light-shielding interlayer area 10g reduces cracking in the second light-shielding layer 10f due to stress concentration. Although the second light-shielding interlayer area 10g overlaps with the metal wiring 10e, the third light-shielding layer 10h is provided in a manner overlapping with the second light-shielding interlayer area 10g that prevents the return light Lr that passes through the second light-shielding interlayer area 10g from being reflected by the metal wiring 10e and emitted from the element substrate 10. This prevents image quality from being degraded, which is due to a light leakage from the peripheral area 10c. The third light-shielding layer 10h is formed in a lattice shape to extend along the second light-shielding interlayer area 10g so that the opening 10i is formed in an area where the metal wiring 10e overlaps with the second light-shielding layer 10f. This reduces cracking in the third light-shielding layer 10h due to stress concentration.

In the embodiment, the surface of the metal wiring 10e at the first substrate 19 side is formed of an aluminum film (Al). Thus the metal wiring 10e can be given low resistance. In this case as well, the third light-shielding layer 10h and the second light-shielding layer 10f prevent the return light Lr from being reflected on the surface of the metal wiring 10e at the first substrate 19 side and emitted from the element substrate 10.

Exemplary Embodiment 2

Figure 15:
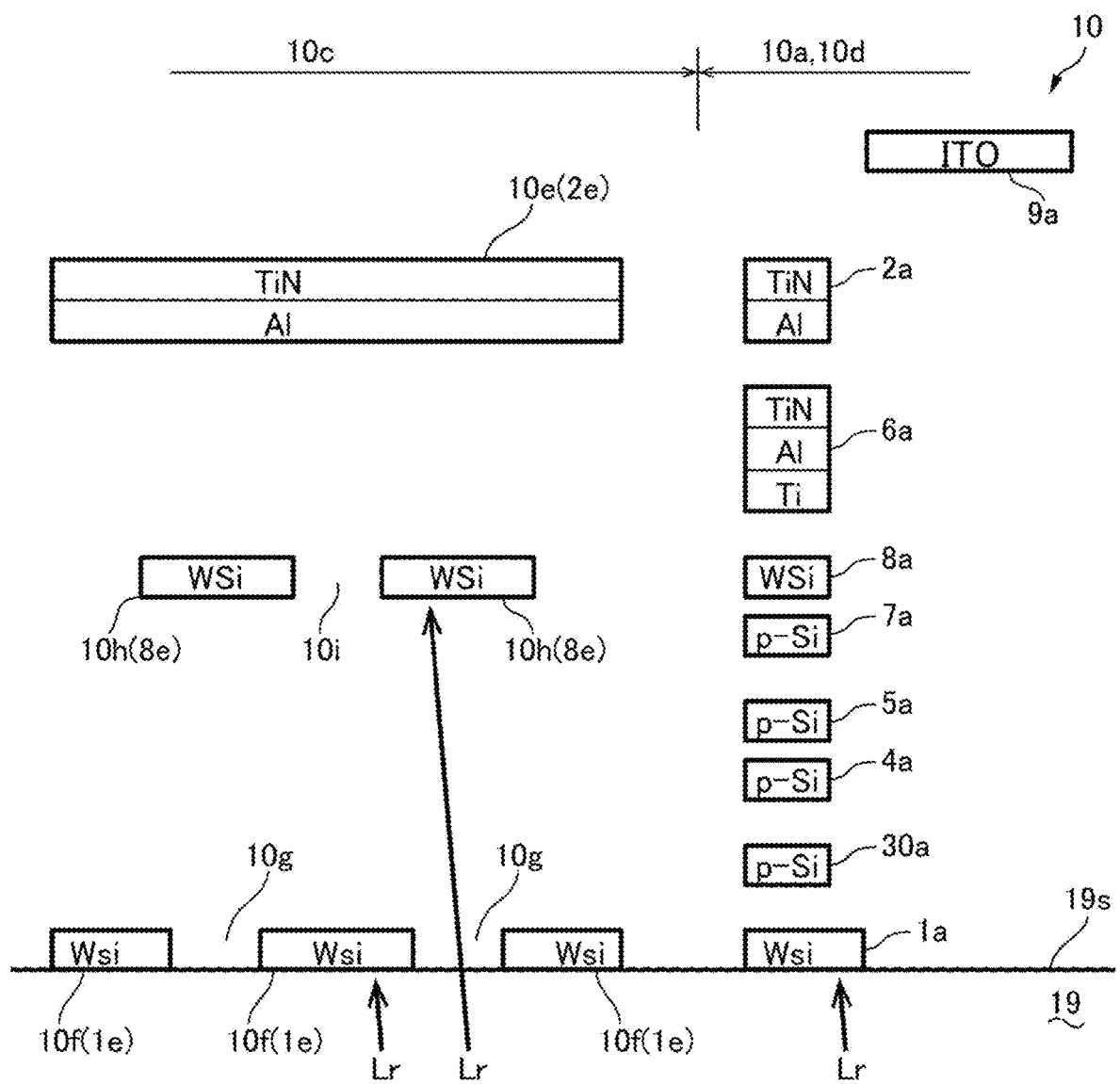
FIG. 15 is an explanatory diagram illustrating the electro-optical device according to Exemplary Embodiment 2 of the invention.

FIG. 15 is an explanatory diagram illustrating the electro-optical device 100 according to Exemplary Embodiment 2 of the invention, which is an explanatory view illustrating a cross-sectional configuration of the element substrate 10. Note that the basic configuration of Exemplary Embodiment 2 and Exemplary Embodiments 3, 4, and 5 described below is the same as the configuration of Exemplary Embodiment 1. Hence, common reference signs are given to common components and its descriptions are omitted. As illustrated in FIG. 15, in Exemplary Embodiment 2 as in Exemplary Embodiment 1, in the peripheral area 10c surrounding the pixel area 10d, there are formed the metal wiring 10e, the plurality of second light-shielding layers 10f overlapping in a plan view with the metal wiring 10e between the metal wiring 10e and the first substrate 19, and the third light-shielding layer 10h overlapping in a plan view with the second light-shielding interlayer area 10g between the metal wiring 10e and the second light-shielding layer 10f. The opening 10i is formed in the third light-shielding layer 10h. The metal wiring 10e, which is a wiring 2e formed using the same conductive material as the capacitor line 2a, is constituted by a two-layer configuration in which an aluminum film (Al) and a titanium nitride film (TiN) are sequentially stacked from the bottom layer side. The second light-shielding layer 10f, which is a layer 1e formed using the same conductive material as the first light-shielding layer 1a, is formed of a tungsten silicide film (WSi). Thus, the surface of the second light-shielding layer 10f at the first substrate 19 side has lower reflectance than the surface of the metal wiring 10e at the first substrate 19 side.

In Exemplary Embodiment 2, the third light-shielding layer 10h, which is a layer 8e formed using the same conductive material as the second capacitor electrode 8a, is formed of a tungsten silicide film (WSi). Thus, the surface of the third light-shielding layer 10h at the first substrate 19 side has lower reflectance than the surface of the metal wiring 10e at the first substrate 19 side.

This allows, as illustrated in FIG. 15, the return light Lr from the modulated light incident on the peripheral area 10c of the element substrate 10 to be blocked by the second light-shielding layer 10f. The return light Lr that passes through the second light-shielding interlayer area 10g of the second light-shielding layer 10f is blocked by the third light-shielding layer 10h. Thus, the return light Lr is prevented from being reflected by the metal wiring 10e and emitted from the element substrate 10. The second light-shielding layer 10f is provided with the second light-shielding interlayer area 10g and the third light-shielding layer 10h is provided with the opening 10i. This reduces, for example, cracking in the second light-shielding layer 10f and the third light-shielding layer 10h due to stress concentration in a similar manner as in Exemplary Embodiment 1.

Exemplary Embodiment 3

Figure 16:
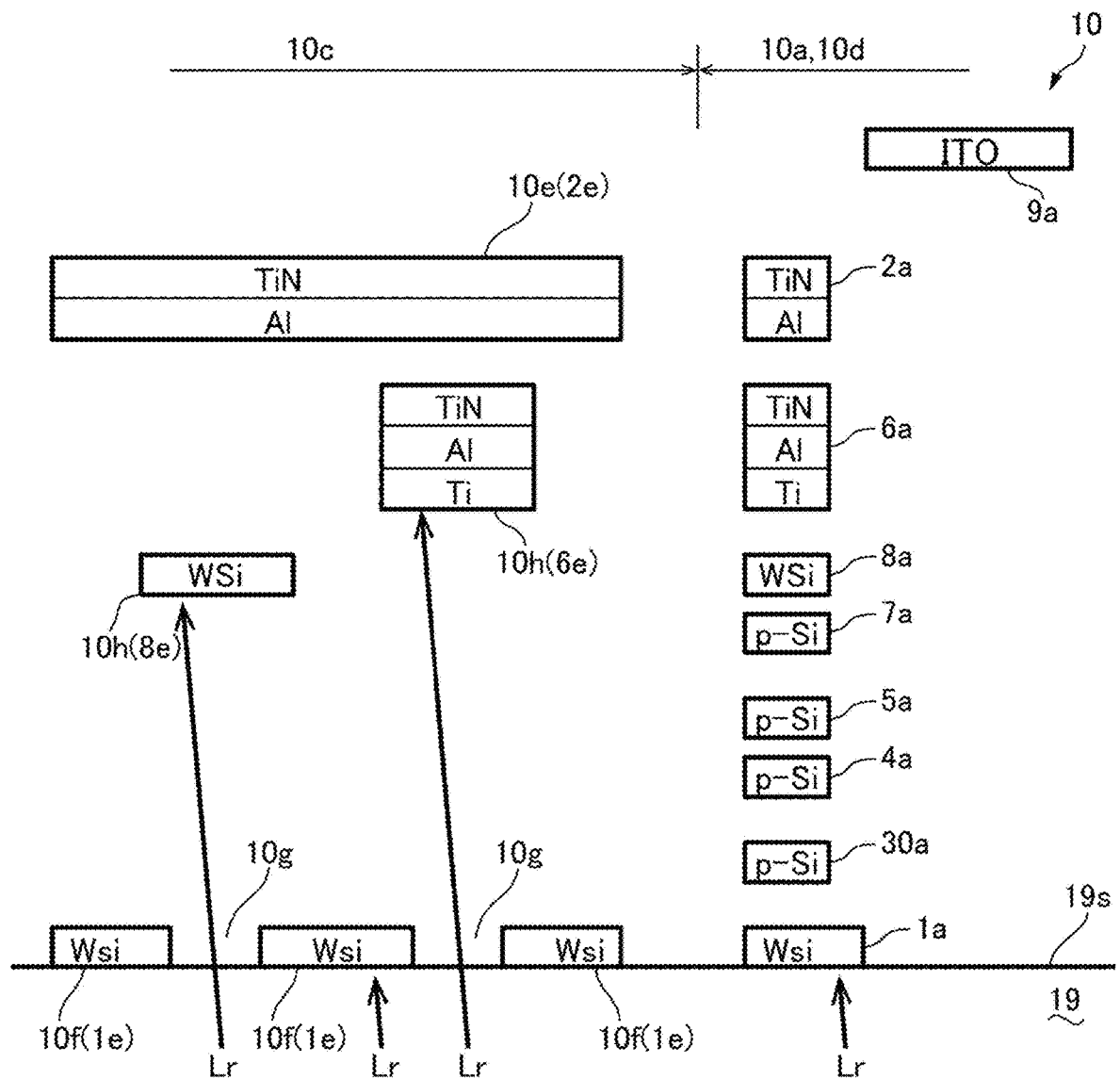
FIG. 16 is an explanatory diagram illustrating the electro-optical device according to Exemplary Embodiment 3 of the invention.
Figure 17:
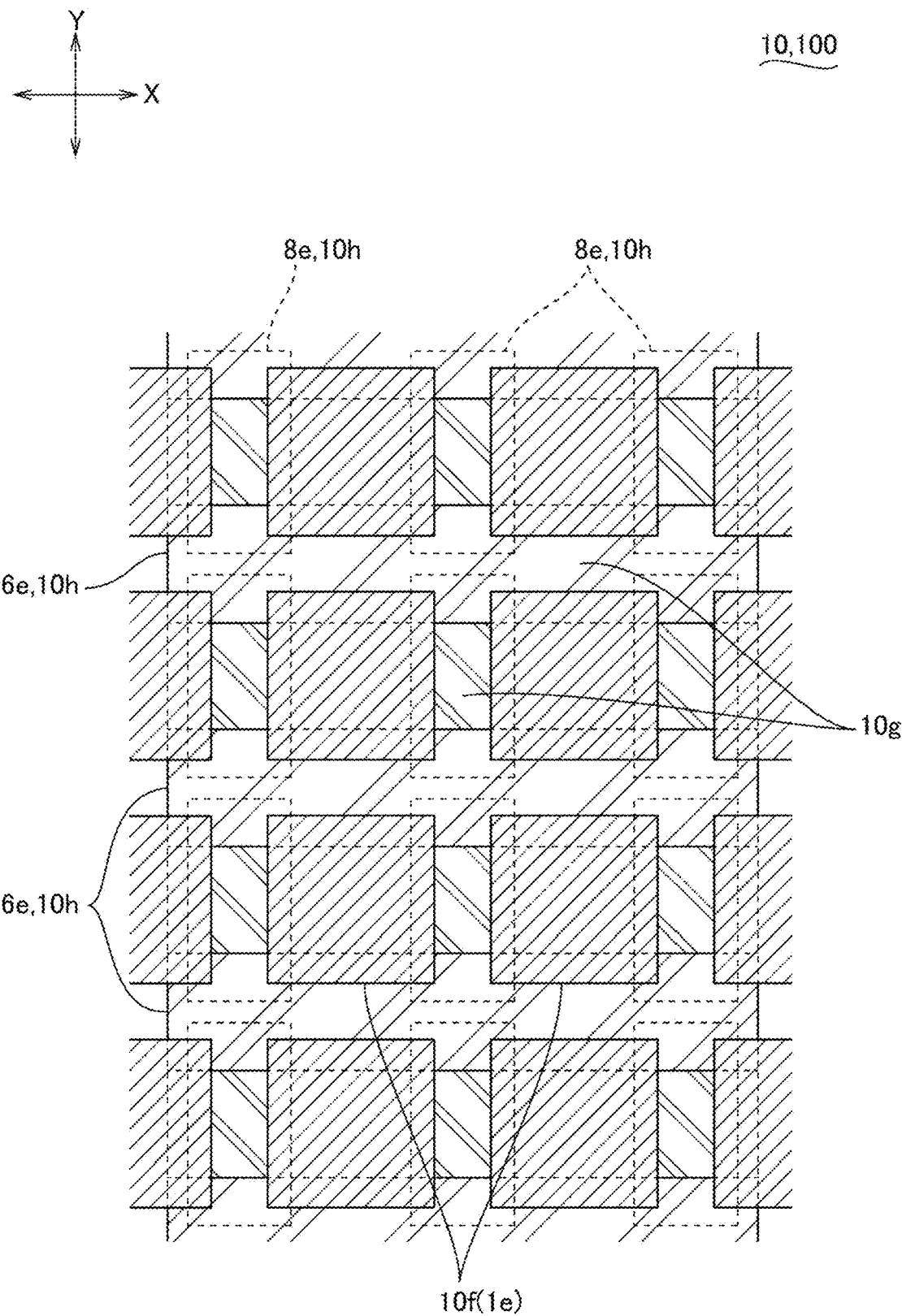
FIG. 17 is an explanatory view illustrating a planar configuration of the third light-shielding layer and the second light-shielding layer that are illustrated in FIG. 16.

FIG. 16 is an explanatory diagram illustrating the electro-optical device 100 according to Exemplary Embodiment 3 of the invention, which is an explanatory view illustrating a cross-sectional configuration of the element substrate 10. FIG. 17 is an explanatory view illustrating a planar configuration of the third light-shielding layer 10h and the second light-shielding layer 10f that are illustrated in FIG. 16. Note that FIG. 17 illustrates the peripheral area 10c of the element substrate 10 as viewed from the side opposed to the counter substrate 20.

As illustrated in FIG. 16, in Exemplary Embodiment 3 as in Exemplary Embodiment 1, in the peripheral area 10c surrounding the pixel area 10d, there are formed the metal wiring 10e, the plurality of second light-shielding layers 10f overlapping in a plan view with the metal wiring 10e between the metal wiring 10e and the first substrate 19, and the third light-shielding layer 10h overlapping in a plan view with the second light-shielding interlayer area 10g between the metal wiring 10e and the second light-shielding layer 10f. The metal wiring 10e, which is a wiring 2e formed using the same conductive material as the capacitor line 2a, is constituted by a two-layer configuration in which an aluminum film (Al) and a titanium nitride film (TiN) are sequentially stacked from the bottom layer side. The second light-shielding layer 10f, which is a layer 1e formed using the same conductive material as the first light-shielding layer 1a, is formed of a tungsten silicide film (WSi). Thus, the surface of the second light-shielding layer 10f at the first substrate 19 side has lower reflectance than the surface of the metal wiring 10e at the first substrate 19 side.

As illustrated in FIG. 16 and FIG. 17, in Exemplary Embodiment 3, the third light-shielding layer 10h includes a layer 6e (the first layer) formed using the same conductive material as the data line 6 a and the layer 8e (the second layer) formed using the same conductive material as the second capacitor electrode 8a. The layers 6e and 8e each overlap in a plan view with a different second light-shielding interlayer area 10g of the second light-shielding layer 10f at a different layer. For example, as illustrated in FIG. 17, the layer 6e at the upper-side is formed, in a state divided into each of a plurality of areas, in a manner overlapping in a plan view with the second light-shielding interlayer area 10g extending in the first direction X. The layer 8e at the lower-side is formed, in a state divided into each of a plurality of areas, in a manner overlapping in a plan view with the second light-shielding interlayer area 10g extending in the second direction Y. Thus, either one of the layers 6e and 8e overlaps in a plan view with the second light-shielding interlayer area 10g.

In Exemplary Embodiment 3, as illustrated in FIG. 16, in the third light-shielding layer 10h, the layer 8e at the lower-side is formed of a tungsten silicide film (WSi) and the layer 6e at the upper-side is constituted by a three-layer configuration in which a titanium film (Ti), an aluminum film (Al), and a titanium nitride film (TiN) are sequentially stacked from the bottom layer side. Thus, the surface of the third light-shielding layer 10h (the layers 6e and 8e) at the first substrate 19 side has lower reflectance than the surface of the metal wiring 10e at the first substrate 19 side.

This allows, as illustrated in FIG. 16, the return light Lr from the modulated light incident on the peripheral area 10c of the element substrate 10 to be blocked by the second light-shielding layer 10f. The return light Lr that passes through the second light-shielding interlayer area 10g of the second light-shielding layer 10f is blocked by the third light-shielding layer 10h. Thus, the return light Lr is prevented from being reflected by the metal wiring 10e and emitted from the element substrate 10. The second light-shielding layer 10f and the third light-shielding layer 10h are each divided into a plurality of areas. This reduces, for example, cracking in the second light-shielding layer 10f and the third light-shielding layer 10h due to stress concentration in a similar manner as in Exemplary Embodiment 1. Although, in Exemplary Embodiment 3, the layer 8e is only used as the third light-shielding layer 10h for preventing the reflection at the metal wiring 10e, the layer 8e may be used as the wiring. In this case as well, the titanium film (Ti) stacked at the lowermost layer side (the first substrate 19 side) among the titanium film (Ti), the aluminum film (Al), and the titanium nitride film (TiN) that constitute the layer 8e serves as the third light-shielding layer that prevents reflection on the aluminum film (Al).

Exemplary Embodiment 4

Figure 18:
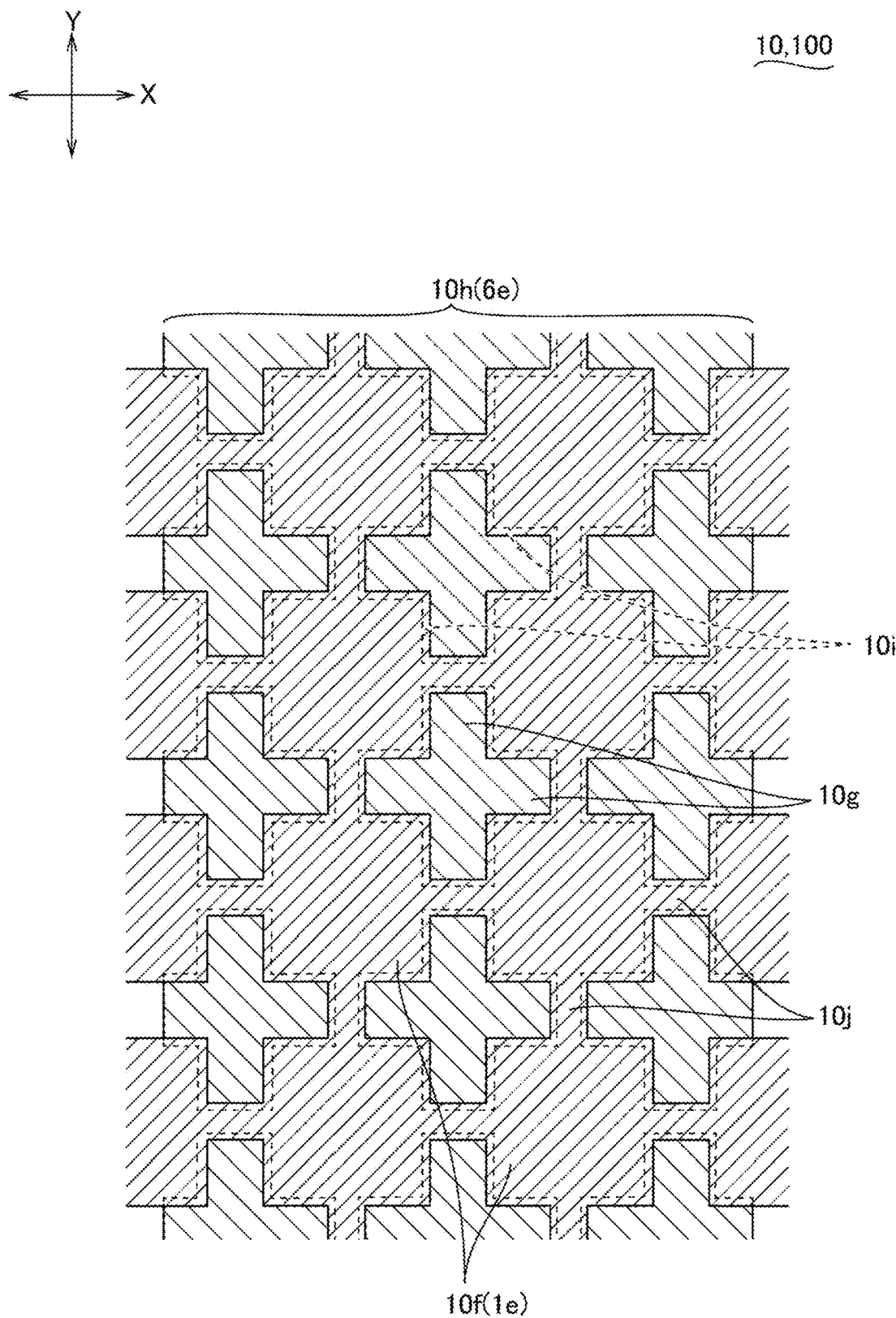
FIG. 18 is an explanatory diagram illustrating the electro-optical device according to Exemplary Embodiment 4 of the invention.

FIG. 18 is an explanatory diagram illustrating the electro-optical device 100 according to Exemplary Embodiment 4 of the invention, which is an explanatory view illustrating a cross-sectional configuration of the element substrate 10. Note that FIG. 18 illustrates the peripheral area 10c of the element substrate 10 as viewed from the side opposed to the counter substrate 20. Although, in Exemplary Embodiments 1 to 3, the second light-shielding interlayer area 10g is provided in a manner dividing the second light-shielding layer 10f into a plurality of rectangular island-like areas, the invention may be applied, as illustrated in FIG. 17, to cases where the island-like areas of the second light-shielding layer 10f that are divided by the second light-shielding interlayer area 10g are coupled to each other via the connecting portions 10j.

Other Exemplary Embodiments

In the above-described exemplary embodiments, the display area 10a is constituted by the same configuration as the dummy pixel area 10b in that the configuration between the pixel electrode 9a and the first substrate 19 is the same as the configuration between the dummy pixel electrode 9b and the first substrate 19. Thus, the display area 10a and the dummy pixel area 10b are each defined as the pixel area 10d. Note that in the dummy pixel area 10b, when the dummy pixel area 10b is greatly different from the pixel area 10d in configuration such as that the pixel transistor 30, the data line 6a, and the like are not formed between the dummy pixel electrode 9b and the first substrate 19, the pixel area 10d only corresponds to the display area 10a, where the dummy pixel area 10b is included in the peripheral area 10c that surrounds the pixel area 10d.

In the above-described exemplary embodiments, although the first light-shielding layer 1a and the second light-shielding layer 10f are formed of a tungsten silicide film (WSi), a tungsten film (W), a titanium nitride film (TiN), a titanium film (Ti), and the like may also be used. In the above-described exemplary embodiments, although the first light-shielding layer 1a and the second light-shielding layer 10f are formed with the same conductive material layers, the invention may be applied to a case where the first light-shielding layer 1a and the second light-shielding layer 10f are formed with different layers. In the above-described exemplary embodiments, although the third light-shielding layer 10h overlaps in a plan view with the second light-shielding interlayer area 10g between the metal wiring 10e and the second light-shielding layer 10f, the third light-shielding layer 10h may overlap in a plan view with the second light-shielding interlayer area 10g at the side opposed to the metal wiring 10e with respect to the second light-shielding layer 10f.

In the above-described exemplary embodiments, although two retention capacitors (the first retention capacitor 551 and the second retention capacitor 552) are formed in each of the pixels of the element substrate 10, the invention may be applied to a case where one retention capacitor is formed in each of the pixels.

Installation Example for Electronic Apparatus

Figure 19:
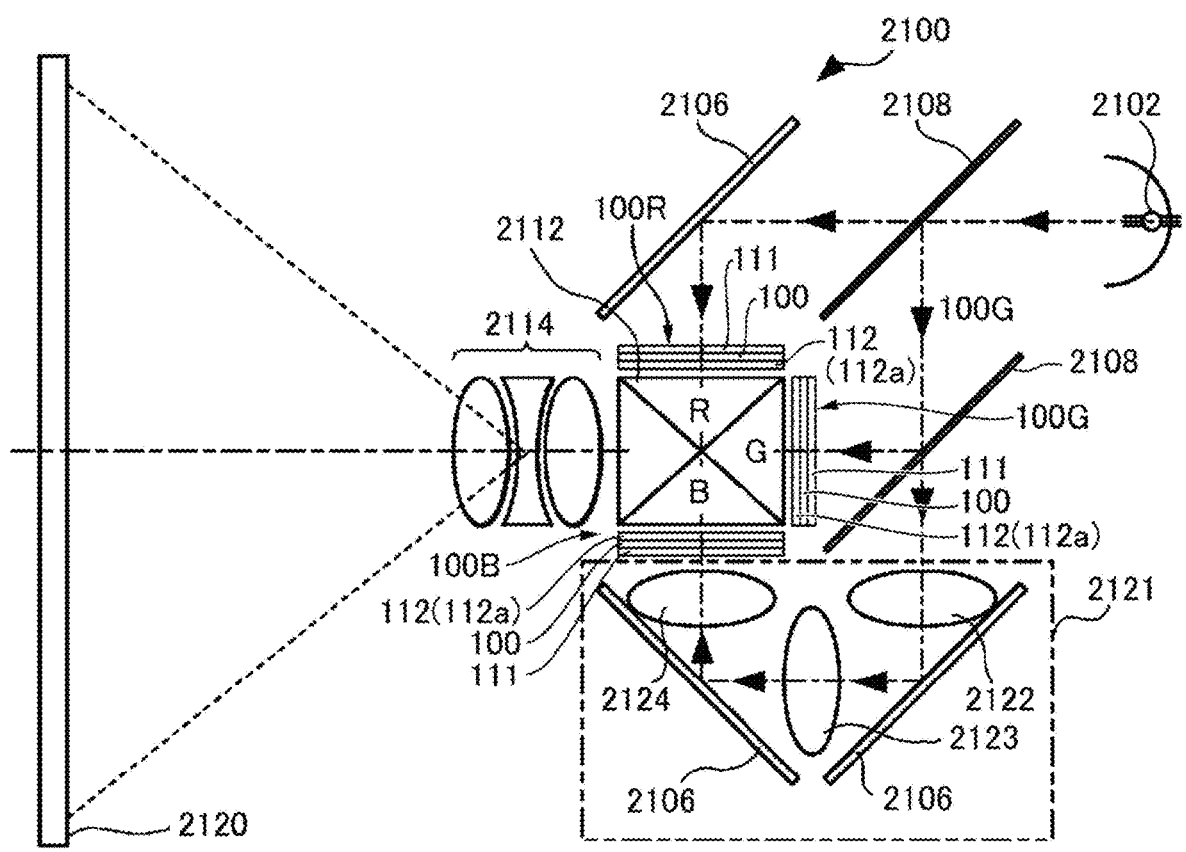
FIG. 19 is a schematic block diagram illustrating a projection-type display apparatus (the electronic apparatus) employing the electro-optical device to which the invention is applied.

An electronic apparatus employing the electro-optical device 100 according to the above-described Exemplary Embodiments is described below. FIG. 19 is a schematic block diagram illustrating a projection-type display apparatus (the electronic apparatus) employing the electro-optical device 100 to which the invention is applied. The projection-type display apparatus 2100 illustrated in FIG. 19 is an example of an electronic apparatus employing the electro-optical device 100. The projection-type display apparatus 2100, in which the electro-optical device 100 is used for a light valve, is configured to conduct high-definition and bright display without making the apparatus large. As illustrated in this figure, a lamp unit 2102 (the light-source unit) including a white light source such as a halogen lamp is installed inside the projection-type display apparatus 2100. The incident light emitted from the lamp unit 2102 is split into the three primary colors of R (red), G (green), and B (blue) by means of three pieces of mirrors 2106 and two pieces of dichroic mirrors 2108 installed inside. The split incident light is guided to light valves 100R, 100G, and 100B corresponding to the primary colors, and then modulated. Note that the light of B color has a long optical path compared to the light of other R color and G color, the light of B color is guided through a relay lens system 2121 including an incidence lens 2122, a relay lens 2123, and an emission lens 2124 to prevent loss. Here, each of the light valves 100R, 100G, and 100B includes an incident-side polarization separation element 111 that overlays at the incident side with the electro-optical device 100, and an emission-side polarization separation element 112 that overlays at the emission side with the electro-optical device 100.

The light modulated by each of the light valves 100R, 100G, and 100B is incident on a dichroic prism 2112 from three directions. Then, at the dichroic prism 2112, the light of R color and the light of B color are reflected at 90 degrees, and the light of G color penetrates. Thus, images of the primary colors are synthesized, and subsequently color images are projected on a screen 2120 by means of a projection lens group 2114 (the projection optical system).

In the projection-type display apparatus 2100 (the electronic apparatus) thus configured, the light that passes through the light valves 100R, 100G, and 100B and is reflected by the dichroic prism 2112 and/or the projection lens group 2114 may occasionally be incident on the element substrate 10 as return light Lr illustrated in FIG. 11. In this case as well, the electro-optical device 100 of Exemplary Embodiments 1 to 4 and the like prevents the return light Lr from being emitted again from the element substrate 10.

A wire-grid polarization separation element 112a disposed as the emission-side polarization separation element 112 in the optical path from the electro-optical device 100 to the projection lens group 2114 (the projection optical system) makes the light that passes through the electro-optical device 100 and is partially reflected by the wire grid polarized light separating element 112a readily incident on the element substrate 10 as the return light Lr illustrated in FIG. 11. In this case as well, the electro-optical device 100 of Exemplary Embodiments 1 to 4 and the like prevents the return light Lr from being emitted again from the element substrate 10.

Other Projection-Type Display Apparatuses

Note that the projection-type display apparatus may be configured such that an LED light source and the like that emits light of colors is used as a light-source unit and the light of colors emitted from the LED light source are each supplied to different liquid-crystal devices for each color of light.

Other Electronic Apparatuses

The electronic apparatus including the electro-optical device 100 to which the invention is applied is not limited to the projection display apparatus 2100 of the above-described embodiment. Other examples of the electronic apparatus include a projection type Head Up Display (HUD), a direct-view type Head Mounted Display (HMD), a personal computer, a digital still camera, a liquid crystal television, and the like.

The entire disclosure of Japanese Patent Application No. 2017-208892, filed Oct. 30, 2017 is expressly incorporated by reference herein.

What is claimed is:

1. A transmissive-type electro-optical device, comprising:
an element substrate that includes a first substrate; a counter substrate opposed to the element substrate; and an electro-optical layer between the element substrate and the counter substrate, wherein the element substrate, in a pixel area, includes:
a plurality of pixel electrodes,
a first light-shielding layer, between the first substrate and at least one of the plurality of pixel electrodes, overlapping in a plan view with an inter-pixel area located between adjacent pixel electrodes of the plurality of pixel electrodes, and
a semiconductor layer for a pixel transistor, between the first light-shielding layer and the at least one of the plurality of pixel electrodes, overlapping in a plan view with the first light-shielding layer, and
the element substrate, in a peripheral area around the pixel area, includes:
a metal wiring,
a second light-shielding layer provided in a manner overlapping with the metal wiring between the first substrate and the metal wiring, the second light-shielding layer including a surface at the first substrate side having lower reflectance than a surface of the metal wiring at the first substrate side, and a third light-shielding layer between the first substrate and the metal wiring, the third light-shielding layer including an opening in an area where the metal wiring overlaps with the second light-shielding layer and including a surface at the first substrate side having lower reflectance than the surface of the metal wiring at the first substrate side, wherein the second light-shielding layer has an island shape, and the second light-shielding layer overlaps with the opening and with the third light shielding layer such that the second light-shielding layer extends in a direction from (a) overlapping with the opening, to (b) overlapping at an edge of the opening, to (c) an edge of the second light-shielding layer overlapping with an interior portion of the third light-shielding layer, and wherein the third light-shielding layer is provided between the metal wiring and the second light-shielding layer.

2. The transmissive-type electro-optical device according to claim 1, wherein the third light-shielding layer is formed of identical material to a conductive material layer constituting a wiring and an electrode in the pixel area.

3. The transmissive-type electro-optical device according to claim 2, wherein the third light-shielding layer includes a capacitor electrode constituting a retention capacitor in the pixel area.

4. The transmissive-type electro-optical device according to claim 1, wherein the third light-shielding layer includes a first layer and a second layer that is formed as a layer different from the first layer.

5. The transmissive-type electro-optical device according to claim 1, wherein the second light-shielding layer is formed of identical material to the first light-shielding layer.

6. The transmissive-type electro-optical device according to claim 1, wherein the metal wiring is formed of identical material to a conductive material layer constituting a wiring and an electrode in the pixel area.

7. The transmissive-type electro-optical device according to claim 1, wherein a surface of the metal wiring at the first substrate side is formed of a metal film containing aluminum as a primary constituent.

8. The transmissive-type electro-optical device according to claim 1, wherein the first light-shielding layer and the second light-shielding layer include, at a surface at the first substrate side, a layer formed of any one of a tungsten silicide film, a tungsten film, a titanium-nitride film, and a titanium film.

9. The transmissive-type electro-optical device according to claim 1, wherein the second light-shielding layer is formed in a layer in which the first light-shielding layer is formed.

10. The transmissive-type electro-optical device according to claim 1, wherein the metal wiring extends in both a first direction and a second direction that intersects the first direction along an outer edge of the pixel area.

11. An electronic apparatus, comprising the transmissive-type electro-optical device according to claim 1.

12. The electronic apparatus according to claim 11, comprising a light-source unit configured to emit a light-source light to be supplied to the transmissive-type electro-optical device, and a projection optical system configured to project light modulated by the transmissive-type electro-optical device.

13. The electronic apparatus according to claim 12, comprising a wire-grid polarization separation element provided in an optical path extending from the transmissive-type electro-optical device to the projection optical system.

* * * * *